US010398977B2

(12) United States Patent
Tang et al.

(10) Patent No.: US 10,398,977 B2
(45) Date of Patent: Sep. 3, 2019

(54) INFORMATION PROCESSING METHOD, TERMINAL, AND COMPUTER STORAGE MEDIUM

(71) Applicant: Tencent Technology (Shenzhen) Company Limited, Shenzhen (CN)

(72) Inventors: Yong Tang, Shenzhen (CN); Yu Chen, Shenzhen (CN); Jianmiao Weng, Shenzhen (CN); Wei Gong, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 98 days.

(21) Appl. No.: 15/791,165

(22) Filed: Oct. 23, 2017

(65) Prior Publication Data

US 2018/0043260 A1    Feb. 15, 2018

Related U.S. Application Data

(63) Continuation-in-part of application No. PCT/CN2016/082393, filed on May 17, 2016.

(30) Foreign Application Priority Data

Sep. 29, 2015   (CN) .......................... 2015 1 0634559

(51) Int. Cl.
*A63F 13/533*   (2014.01)
*A63F 13/335*   (2014.01)
(Continued)

(52) U.S. Cl.
CPC .......... *A63F 13/533* (2014.09); *A63F 13/335* (2014.09); *A63F 13/42* (2014.09);
(Continued)

(58) Field of Classification Search
None
See application file for complete search history.

(56) References Cited

U.S. PATENT DOCUMENTS

| 2011/0124409 A1* | 5/2011 | Baynes | A63F 13/67 463/30 |
| 2013/0191784 A1* | 7/2013 | Noto | G06F 3/0482 715/834 |

(Continued)

FOREIGN PATENT DOCUMENTS

| CN | 104066488 A | 9/2014 |
| CN | 104093463 A | 10/2014 |

(Continued)

OTHER PUBLICATIONS

Tencent Technology, ISR, PCT/CN2016/082393, dated Aug. 26, 2016.

(Continued)

*Primary Examiner* — Jason T Yen
(74) *Attorney, Agent, or Firm* — Morgan, Lewis & Bockius LLP

(57) ABSTRACT

A method includes: displaying, in a game user interface, a first game scene including at least one game character; displaying a skill selection object in the game user interface, the skill selection object including a plurality skill slots; determining a set of deployable skills corresponding to the first game scene, wherein a total number and types of skills included the set of deployable skills are dynamically determined based on a predefined set of characteristics of the first game scene; and distributing the set of deployable skills into one or more of the plurality of skill slots in the skill selection object, wherein a corresponding skill is deployed in the first game scene when selected by a user from the one or more of the plurality of skill slots in the skill selection object.

20 Claims, 9 Drawing Sheets

(51) Int. Cl.
*A63F 13/42* (2014.01)
*A63F 13/5378* (2014.01)
*G06F 3/0488* (2013.01)
*G06F 3/0482* (2013.01)
*G06F 3/0484* (2013.01)

(52) U.S. Cl.
CPC ........ *A63F 13/5378* (2014.09); *G06F 3/0482* (2013.01); *G06F 3/0488* (2013.01); *G06F 3/04842* (2013.01); *G06F 3/04883* (2013.01); *A63F 2300/307* (2013.01); *A63F 2300/308* (2013.01)

(56) References Cited

U.S. PATENT DOCUMENTS

| | | | |
|---|---|---|---|
| 2014/0143676 A1* | 5/2014 | Tan | G06F 3/0484 |
| | | | 715/744 |
| 2014/0243079 A1* | 8/2014 | Tsukioka | A63F 13/12 |
| | | | 463/29 |
| 2014/0302901 A1* | 10/2014 | Namgoong | A63F 13/533 |
| | | | 463/4 |
| 2016/0092065 A1* | 3/2016 | Hilbert | G07F 17/3262 |
| | | | 463/13 |

FOREIGN PATENT DOCUMENTS

| | | |
|---|---|---|
| CN | 104168969 A | 11/2014 |
| CN | 104252291 A | 12/2014 |
| CN | 104548600 A | 4/2015 |
| CN | 105094346 A | 11/2015 |
| JP | 2000284879 A | 10/1999 |

OTHER PUBLICATIONS

Tencent Technology, Written Opinion, PCT/CN2016/082393, dated Aug. 26, 2016, 7 pgs.
Tencent Technology, IPRP, PCT/CN2016/082393, dated Apr. 3, 2018, 8 pgs.

\* cited by examiner

INFORMATION PROCESSING METHOD, TERMINAL, AND COMPUTER STORAGE MEDIUM

PRIORITY CLAIM AND RELATED APPLICATION

This application is a continuation-in-part application of PCT/CN2016/082393, entitled "INFORMATION PROCESSING METHOD, TERMINAL AND COMPUTER STORAGE MEDIUM" filed on May 17, 2016, which claims priority to Chinese Patent Application No. 201510634559.4, filed with the State Intellectual Property Office of the People's Republic of China on Sep. 29, 2015, and entitled "INFORMATION PROCESSING METHOD, TERMINAL AND COMPUTER STORAGE MEDIUM", both of which are incorporated herein by reference in their entirety.

FIELD OF THE TECHNOLOGY

The present disclosure relates to information exchange technologies, and in particular, to an information processing method, a terminal, and a computer storage medium.

BACKGROUND OF THE DISCLOSURE

With gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

SUMMARY

In an information exchange process, a particular capability (e.g., skills or effects) needs to be additionally added to enrich a presentation form and content of information, and different presentation forms and content of information may finally lead to different interaction results. Currently, a particular capability is randomly added at any location in a graphical user interface, and a location is not fixed. Consequently, it is inconvenient for a user to perform searching, and to add an increasing quantity of capabilities, an area of a screen is massively occupied, affecting efficiency of performing another operation by the user, easily causing a misoperation, and affecting operation precision. However, in related technologies, there is still no effective solution to the problem.

In view of this, embodiments of the present technology expect to provide an information processing method, a terminal, and a computer storage medium, so as to at least resolve a problem in the existing technology, so that a location of additionally added particular capability is determined, and it is convenient for a user to perform searching; and no matter how a quantity of added capabilities increases, an area of a screen is not massively occupied, thereby not affecting efficiency of performing another operation by the user, avoiding a misoperation, and improving operation precision.

The technical solutions in the embodiments of the present technology are implemented as follows:

An embodiment of the present technology provides an information processing method, a software application being executed on a processor of a terminal and rendering being performed on a display of the terminal, to obtain a graphical user interface, the processor, the graphical user interface, and the software application being implemented in a game system, and the method including:

performing rendering in the graphical user interface, to obtain at least one virtual resource object;

performing rendering in the graphical user interface, to obtain a skill ring object when detecting a skill operation trigger gesture on at least one skill operation object deployed in a skill operation area in the graphical user interface, the skill ring object including M window locations for placing a skill object, and M being a positive integer; and performing, when detecting a skill release operation gesture on at least one skill object in the M window locations, a skill release operation on the at least one skill object.

An embodiment of the present technology provides an information processing method, a software application being executed on a processor of a terminal and rendering being performed on a display of the terminal, to obtain a graphical user interface, the processor, the graphical user interface, and the software application being implemented in a game system, and the method including:

performing rendering in the graphical user interface, to obtain at least one virtual resource object;

performing rendering in the graphical user interface, to obtain at least one skill arc object when detecting a skill operation trigger gesture on at least one skill operation object deployed in a skill operation area in the graphical user interface, the skill arc object including M window locations for placing a skill object, and M being a positive integer;

detecting a slide operation gesture on the at least one skill arc object, and triggering switching and display of N different skill objects that are sorted in order in the M window locations, N being a positive integer, and N>M; and performing, when detecting a skill release operation gesture on at least one skill object currently displayed in the M window locations, a skill release operation on the at least one skill object.

An embodiment of the present technology provides a terminal, a software application being executed on a processor of the terminal and rendering being performed on a display of the terminal, to obtain a graphical user interface, the processor, the graphical user interface, and the software application being implemented in a game system, and the terminal further including:

a first rendering unit, configured to perform rendering in the graphical user interface, to obtain at least one virtual resource object;

a second rendering unit, configured to: perform rendering in the graphical user interface, to obtain a skill ring object when a skill operation trigger gesture on at least one skill operation object deployed in a skill operation area in the graphical user interface is detected, the skill ring object including M window locations for placing a skill object, and M being a positive integer; and a first detection unit, configured to perform, when detecting a skill release operation gesture on at least one skill object in the M window locations, a skill release operation on the at least one skill object.

An embodiment of the present technology provides a terminal, a software application being executed on a processor of the terminal and rendering being performed on a display of the terminal, to obtain a graphical user interface, the processor, the graphical user interface, and the software application being implemented in a game system, and the terminal including:

a first rendering unit, configured to perform rendering in the graphical user interface, to obtain at least one virtual resource object;

a second rendering unit, configured to: perform rendering in the graphical user interface, to obtain at least one skill arc object when a skill operation trigger gesture on at least one skill operation object deployed in a skill operation area in the graphical user interface is detected, the skill arc object including M window locations for placing a skill object, and M being a positive integer;

a first detection unit, configured to: detect a slide operation gesture on the at least one skill arc object, and trigger switching and display of N different skill objects that are sorted in order in the M window locations, N being a positive integer, and N>M; and a second detection unit, configured to perform, when detecting a skill release operation gesture on at least one skill object currently displayed in the M window locations, a skill release operation on the at least one skill object.

An embodiment of the present technology provides a terminal, the terminal including: a display and a processor; the display being configured to: execute a software application on the processor of the terminal and then perform rendering on the software application, to obtain a graphical user interface; and the graphical user interface being configured to facilitate control processing in man-machine interaction;

the processor being configured to perform the information processing method in the foregoing solutions; and the processor, the graphical user interface, and the software application being implemented in a game system.

An embodiment of the present technology provides a computer storage medium, a computer executable instruction being stored in the computer storage medium, and the computer executable instruction being configured to perform the information processing method in the foregoing solutions.

In the information processing method in the embodiments of the present technology, a software application is executed on a processor of a terminal and rendering is performed on a display of the terminal, to obtain a graphical user interface, the processor, the graphical user interface, and the software application are implemented in a game system, and the method includes: performing rendering in the graphical user interface, to obtain at least one virtual resource object; performing rendering in the graphical user interface, to obtain a skill ring object when detecting a skill operation trigger gesture on at least one skill operation object deployed in a skill operation area in the graphical user interface, the skill ring object including M window locations for placing a skill object, and M being a positive integer; and performing, when detecting a skill release operation gesture on at least one skill object in the M window locations, a skill release operation on the at least one skill object.

In the another information processing method in the embodiments of the present technology, a software application is executed on a processor of a terminal and rendering is performed on a display of the terminal, to obtain a graphical user interface, the processor, the graphical user interface, and the software application are implemented in a game system, and the method includes: performing rendering in the graphical user interface, to obtain at least one virtual resource object; performing rendering in the graphical user interface, to obtain at least one skill arc object when detecting a skill operation trigger gesture on at least one skill operation object deployed in a skill operation area in the graphical user interface, the skill arc object including M window locations for placing a skill object, and M being a positive integer; detecting a slide operation gesture on the at least one skill arc object, and triggering switching and display of N different skill objects that are sorted in order in the M window locations, N being a positive integer, and N>M; and performing, when detecting a skill release operation gesture on at least one skill object currently displayed in the M window locations, a skill release operation on the at least one skill object.

By means of the foregoing two solutions in the embodiments of the present technology, a skill ring object or a skill arc object (a skill arc is a part of a skill ring) is deployed at a determined location. The skill ring object or skill arc object is also referred to as a skill or effect selection object, and the each skill or effect included in the skill selection object is placed in a skill slot of the skill or effect selection object, and a skill slot with a skill included forms a skill or effect selection affordance for that skill or effect. Therefore, it is convenient for a user to perform searching, and find the skill ring object or the skill arc object easily, so as to perform a subsequent skill release operation (also referred to as a skill or effect deployment operation). The skill ring object or the skill arc object includes M window locations (e.g., also referred to as "slots") that do not occupy a lot of space, and there are N corresponding specific skill objects (e.g., icons or images representing particular skills or effects). In a case of the skill ring object, N=M, a response is made by means of a detected touch operation, and further, a skill release operation is performed on at least one skill object when a corresponding skill release operation gesture is detected. In a case of the skill arc object, N>M, a response is made by means of a detected slide operation (e.g., a swipe gesture in a respective direction tangential to the arc), and further, a skill release operation is further performed on at least one skill object when a corresponding skill release operation gesture is detected. As can be learned, no matter how a quantity of added skills increases, an area of a screen is not massively occupied, because the M window locations keep unchanged. Therefore, by means of the embodiments of the present technology, efficiency of performing another operation by a user is not affected, a misoperation is avoided, and operation precision is improved. In addition, an area of a screen is not massively occupied.

DESCRIPTION OF EMBODIMENTS

Implementation of the technical solutions is further described in detail below with reference to the accompanying drawings.

Figure 1:
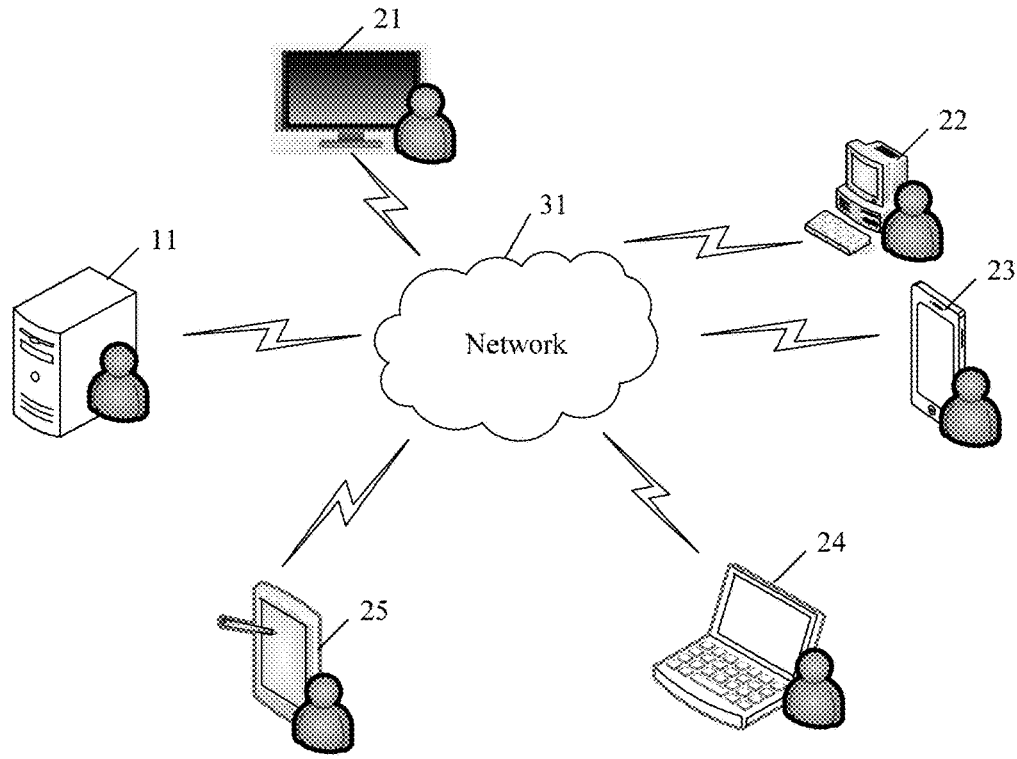
FIG. 1 is a schematic diagram of various hardware entities that perform information exchange according to an embodiment of the present technology.

FIG. 1 is a schematic diagram of various hardware entities that perform information exchange according to an embodiment of the present technology. FIG. 1 includes: one or more servers 11 to 1n, terminal devices 21 to 25, and a network 31. The network 31 includes network entities such as a router and a gateway, which are not shown in the figure. The terminal devices 21 to 25 perform information exchange with the server by using a wired network or a wireless network, so as to download an application and/or an application update data packet and/or application related data information or service information from the server 11. A type of the terminal device is shown in FIG. 1, and includes a mobile phone (the terminal 23), a tablet computer or a PDA (the terminal 25), a desktop computer (the terminal 22), a PC (the terminal 24), an all-in-one PC (the terminal 21), and other types. Various applications, for example, an application having an entertainment function (such as a video application, an audio play application, a game application, or reading software) or an application having a serving function (such as a map navigation application, or a group purchasing application), required by a user are installed in the terminal device.

Based on a system shown in FIG. 1, a game scene is used as an example. The terminal devices 21 to 25 download, by using the network 31, a game application and/or a game application update data packet and/or game application related data information or service information from the servers 11 to 1n according to a requirement. By means of embodiments of the present technology, after the game application is started on the terminal device and a game interface obtained through rendering is entered, at least one skill resource object (e.g., also referred to as a skill selection object or effect selection object) is deployed in at least one skill operation area in the game interface, where the skill resource object specifically includes a skill ring object or a skill arc object (a skill arc is a part of a skill ring). When the skill resource object is the skill ring object, the skill ring object includes M window locations for placing a skill object, M being a positive integer; and a skill release operation is performed on at least one skill object when a skill release operation gesture on the at least one skill object in the M window locations is detected. When the skill resource object is the skill arc object, the at least one skill arc object includes M window locations, M being a positive integer; switching and display of N different skill objects that are sorted in order are triggered in the M window locations when a slide operation gesture on the at least one skill arc object is detected, N being a positive integer, and N>M; and a skill release operation is performed, when a skill release operation gesture on at least one skill object currently displayed in the M window locations is detected, on the at least one skill object. Because the M window locations keep unchanged (certainly, a window quantity refreshing operation on a quantity of the M window locations, such as adding, deletion, or changing according to a user requirement is not ruled out subsequently; in this case, a window location changes, but in a current operation state, a quantity of current window locations is unchanged), the N skill objects are switched and displayed in the M window locations.

For both a skill ring and a skill arc, the M window locations keep unchanged. Therefore, a location of an additionally added particular skill is determined, so that it is convenient for a user to perform searching. No matter how a quantity of added skills increases, an area of a screen is not massively occupied, thereby not affecting efficiency of performing another operation by the user, avoiding a misoperation, and improving operation precision.

The example in FIG. 1 is only an example of a system architecture for implementing the embodiments of the present technology, and the embodiments of the present technology are not limited to the system architecture in FIG. 1. Based on the system architecture, various embodiments of the present technology are provided.

Herein, it should be noted that, a skill ring object or a skill arc object is used as an example for description in this specification. The skill ring object or the skill arc object is an example of a skill container object, or referred to as a skill resource object. The skill container object, or referred to as a skill resource object, obtained through rendering in a graphical user interface includes, but is not limited to, a bar shape, an annular shape, a ring shape, a shape of a wheel, and other shapes, as long an area used for replacing a skill resource object can be implemented.

Figure 2:
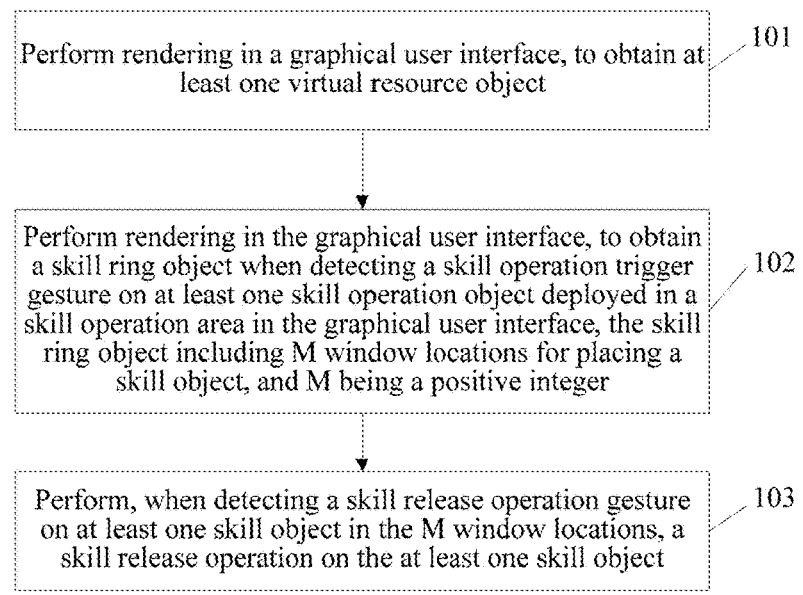
FIG. 2 is a schematic flowchart of a method according to some embodiments of the present technology.

In some embodiments, a software application is executed on a processor of a terminal and rendering is performed on a display of the terminal, to obtain a graphical user interface. The processor, the graphical user interface, and the software application are implemented in a game system. As shown in FIG. 2, the method includes the following operations:

Operation 101: Perform rendering in the graphical user interface, to obtain at least one virtual resource object.

Herein, the term "virtual resource object" includes various types of objects in the graphical user interface (e.g., game user interface). For example, a user avatar icon for representing a user of the device, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Operation 102: Perform rendering in the graphical user interface, to obtain a skill ring object (e.g., the skill ring object is an example of a skill or effect selection object shaped like a ring with multiple slots around the ring) when detecting a skill operation trigger gesture (e.g., a touch gesture on the touch-sensitive display) on at least one skill operation object (e.g., a respective skill or effect selection object occupying a slot in the skill ring object) deployed in a skill operation area (e.g., a region of the game scene that includes targets of the skill operation) in the graphical user interface, the skill ring object including M window locations for placing a skill object, and M being a positive integer.

Herein, the skill ring object may include a circular ring or a square ring. A center point of the skill ring object is preferably the skill operation object. A user may perform a series of update operations such as adding and deletion in a self-defined manner on a skill object (such as a specific skill) in a skill ring.

Figure 3:
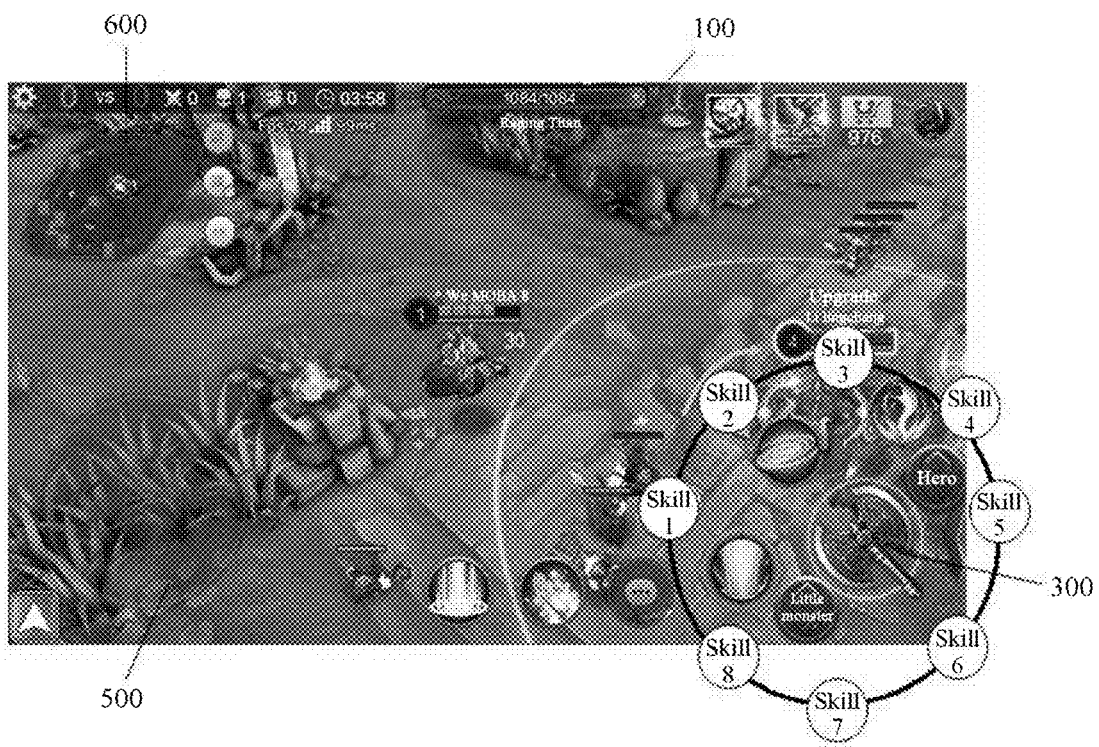
FIG. 3, FIG. 4, FIG. 7, and FIG. 8 are schematic diagrams of application of obtained user interaction interfaces (UI) according to some embodiments of the present technology.

Herein, FIG. 3 is a schematic diagram of a UI. FIG. 3 includes: a graphical user interface 100, a skill object 300, a skill ring object formed by an annular area including a skill object 1 to a skill object 8, a function key object 500 for controlling a user to move and launch attack, and a mini map object 600 that can enable a current user to view deployment and layout of two parties (e.g., opposing game teams) in a large map shown in the graphical user interface. The skill ring object includes eight window locations each for placing a skill object. One skill object is placed in each window location, and currently, eight skill objects are placed in total.

Herein, although a window location may be specifically set according to a user requirement randomly, after the window location is preset, the window location is a determined location on a screen, so that it is convenient for the user to rapidly and easily find the skill ring object.

Herein, with reference to operation 103, a skill release operation is performed, when a skill release operation gesture on at least one skill object in the M window locations is detected, on the at least one skill object. The example in FIG. 3 is still used for description. In the current UI shown in FIG. 3, N is 8 currently, M is 8 currently, and the two are the same in value. The user may perform skill release by means of a touch or slide operation. Skill release by means of a slide operation is shown in FIG. 3, for example, the user drags a skill 2 to a skill ring and then performs skill release. For another examples, the user touches a skill 5 and then performs skill release.

Figure 4:
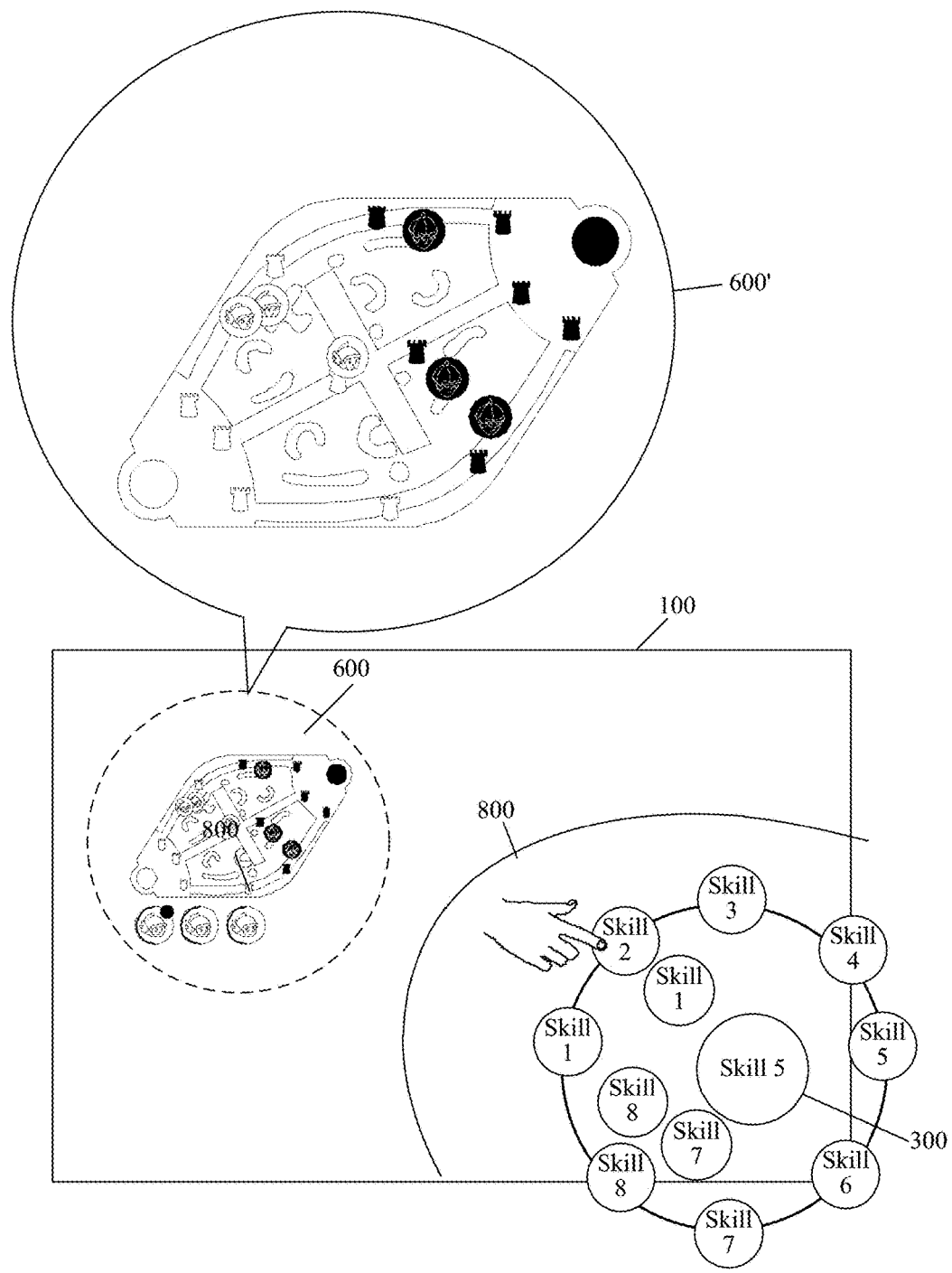

Herein, it should be noted that, the UI shown in FIG. 3 obtained through rendering by a processor of a terminal device, which is specifically an image processor is only a specific example. For example, a UI shown in FIG. 4 is another example. Different personnel deployment scenarios in a game are used for description, for example, numbers of deployed persons of two parties are 3 to 3. Versus modes displayed in a large map and a mini map are different, are not limited to 3 to 3, and may be 5 to 5 or versus modes in which numbers of deployed persons of two parties are different, such as 20 to 40 or 30 to 60. When numbers of deployed persons of two parties are the same, a one-to-one mode is a case in which numbers of deployed persons of two parties are both 1. Referring to the UI in FIG. 4, an only difference is numbers of deployed persons in the mini map in the UI. Details are not described herein, and details are provided subsequently.

Operation 103: Perform, when detecting a skill release operation gesture on at least one skill object in the M window locations, a skill release operation on the at least one skill object.

Herein, refer to descriptions of operation 102, and details are not described again. It should be noted that, FIG. 3 is only an example. In this embodiment of the present technology, a quantity of window locations corresponding to the skill ring object is not limited to 8 and may be 9, 10, or the like, and is determined according to a size of a screen of a terminal of the user. The principle is that: window locations of the skill ring object should not occupy too much of the screen, and should be determined locations.

In an implementation of this embodiment of the present technology, the method further includes: setting a center point of the skill ring object as the skill operation object.

In an implementation of this embodiment of the present technology, the skill objects in the skill ring are distributed in an annular shape; and the skill object includes preset icon information.

In an implementation of this embodiment of the present technology, the method further includes: obtaining a touch operation on the skill ring object, and triggering display of M skill objects that are sorted in a preset order in the preset M window locations. As shown in FIG. 3, the skill ring object currently has eight window locations, and correspondingly, eight skill objects are placed.

In an implementation of this embodiment of the present technology, the M window locations are refreshed to M+j window locations after a quantity of window locations occupied by the skill ring object is adjusted according to collected user requirement information, where j is a positive integer greater than zero. For example, FIG. 3 is only an example. In this embodiment of the present technology, the quantity of window locations corresponding to the skill ring object is not limited to 8 and may be 9, 10, or 11, and is determined according to the size of the screen of the terminal of the user. The principle is that: window locations of the skill ring object should not occupy too much of the screen, and should be determined locations. After a default setting is completed, refreshing may be performed as in this implementation. For example, a user logs in to a game system by using a same account. The user plays a game by using a mobile phone at first, and then switches to a tablet computer to play the game. Because a screen of the tablet computer is larger than that of the mobile phone, if a quantity of windows that is set by default is 8 before, after the tablet computer is switched to, a quantity of windows in a UI of the game is 10 after refreshing.

Figure 5:
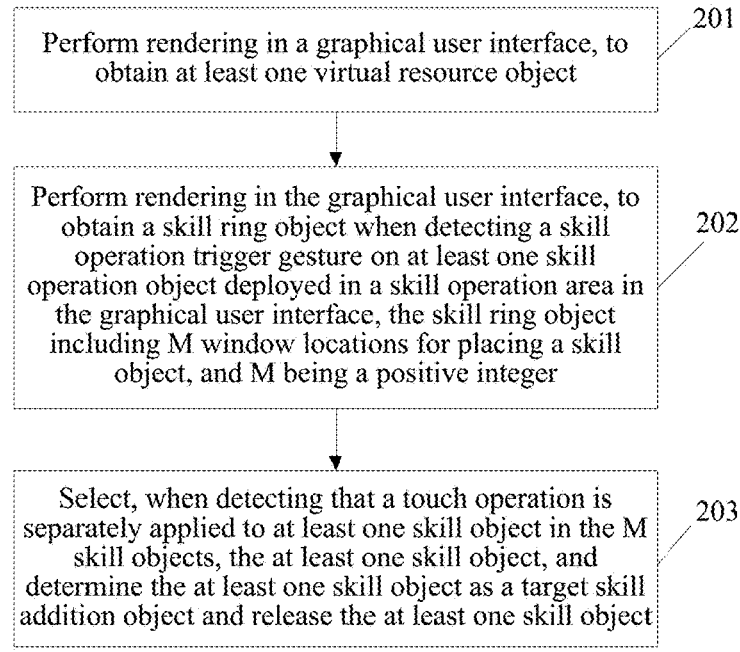
FIG. 5 is a schematic flowchart of a method according to some embodiments of the present technology.

This embodiment of the present technology provides an information processing method. A software application is executed on a processor of a terminal and rendering is performed on a display of the terminal, to obtain a graphical user interface. The processor, the graphical user interface, and the software application are implemented in a game system. As shown in FIG. 5, the method includes the following operations:

Operation 201: Perform rendering in the graphical user interface, to obtain at least one virtual resource object.

Herein, the virtual resource object covers various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Operation 202: Perform rendering in the graphical user interface, to obtain a skill ring object when detecting a skill operation trigger gesture on at least one skill operation object deployed in a skill operation area in the graphical user interface, the skill ring object including M window locations for placing a skill object, and M being a positive integer.

Herein, the skill ring object may include a circular ring or a square ring. A center point of the skill ring object is preferably the skill operation object. A user may perform a series of update operations such as adding and deletion in a self-defined manner on a skill object (such as a specific skill) in a skill ring.

Herein, FIG. 3 is a schematic diagram of a UI. FIG. 3 includes: a graphical user interface 100, a skill object 300, a skill ring object, a function key object 500 for controlling a user to move and launch attach, and a mini map object 600 that can enable a current user to view deployment and layout of two parties in a large map shown in the graphical user interface. The skill ring object is an annular area including a skill object 1 to a skill object 8. The skill ring object includes eight window locations for placing a skill object. One skill object is placed in each window location, and currently, eight skill objects are placed in total.

Herein, although a window location may be specifically set according to a user requirement randomly, after the window location is preset, the window location is a determined location on a screen, so that it is convenient for the user to rapidly and easily find the skill ring object.

Herein, with reference to operation 203, when it is detected that a touch operation is separately applied to at least one skill object in the M skill objects, the at least one skill object is selected, and the at least one skill object is determined as a target skill addition object and the at least one skill object is released. The example in FIG. 3 is still used for description. In the current UI shown in FIG. 3, N is 8 currently, M is 8 currently, and the two are the same in value. The user may perform skill release by means of a touch or slide operation. Skill release by means of a slide operation is shown in FIG. 3, for example, the user drags a skill 2 to a skill ring and then performs skill release. For another examples, the user touches a skill 5 and then performs skill release.

Herein, it should be noted that, the UI shown in FIG. 3 obtained through rendering by a processor of a terminal device, which is specifically an image processor is only a specific example. For example, a UI shown in FIG. 4 is another example. Different personnel deployment scenarios in a game are used for description, for example, numbers of deployed persons of two parties are 3 to 3. Versus modes displayed in a large map and a mini map are different, are not limited to 3 to 3, and may be 5 to 5 or versus modes in which numbers of deployed persons of two parties are different, such as 20 to 40 or 30 to 60. When numbers of deployed persons of two parties are the same, a one-to-one mode is a case in which numbers of deployed persons of two parties are both 1. Referring to the UI in FIG. 4, an only difference is numbers of deployed persons in the mini map in the UI. Details are not described herein, and details are provided subsequently.

Operation 203: Select, when detecting that a touch operation is separately applied to at least one skill object in the M skill objects, the at least one skill object, and determine the at least one skill object as a target skill addition object and release the at least one skill object.

Herein, FIG. 4 is a schematic diagram of another UI. The skill ring object is still the annular area including the skill object 1 to the skill object 8. The skill ring object includes eight window locations for placing a skill object. One skill object is placed in each window location, and currently, eight skill objects are placed in total. FIG. 4 shows a three-to-three versus mode. As shown in a mini map 600 and an enlarged local view 600' thereof, FIG. 4 further includes: a skill release area 800. When it is detected that the touch operation is applied to the skill object 2, the skill object 2 is selected, and the skill object 2 is determined as the target skill addition object and is released in the skill release area 800.

In an implementation of this embodiment of the present technology, the method further includes: setting a center point of the skill ring object as the skill operation object.

In an implementation of this embodiment of the present technology, the skill objects in the skill ring are distributed in an annular shape; and the skill object includes preset icon information.

In an implementation of this embodiment of the present technology, the method further includes: obtaining a touch operation on the skill ring object, and triggering display of M skill objects that are sorted in a preset order in the preset M window locations. As shown in FIG. 3, the skill ring object currently has eight window locations, and correspondingly, eight skill objects are placed. A skill object can be released by tapping the skill object.

In an implementation of this embodiment of the present technology, the M window locations are refreshed to M+j window locations after a quantity of window locations occupied by the skill ring object is adjusted according to collected user requirement information, where j is a positive integer greater than zero. For example, FIG. 3 is only an example. In this embodiment of the present technology, the quantity of window locations corresponding to the skill ring object is not limited to 8 and may be 9, 10, or 11, and is determined according to the size of the screen of the terminal of the user. The principle is that: window locations of the skill ring object should not occupy too much of the screen, and should be determined locations. After a default setting is completed, refreshing may be performed as in this implementation. For example, a user logs in to a game system by using a same account. The user plays a game by using a mobile phone at first, and then switches to a tablet computer to play the game. Because a screen of the tablet computer is larger than that of the mobile phone, if a quantity of windows that is set by default is 8 before, after the tablet computer is switched to, a quantity of windows in a UI of the game is 10 after refreshing.

Figure 6:
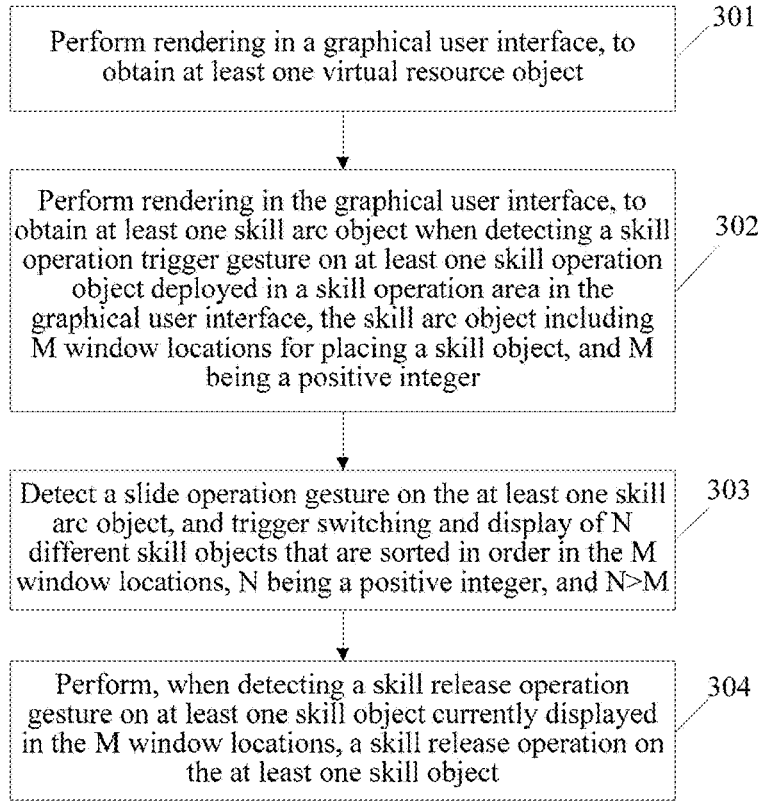
FIG. 6 is a schematic flowchart of a method according to some embodiments of the present technology.

This embodiment of the present technology provides an information processing method. A software application is executed on a processor of a terminal and rendering is performed on a display of the terminal, to obtain a graphical user interface. The processor, the graphical user interface, and the software application are implemented in a game system. As shown in FIG. 6, the method includes the following operations:

Operation 301: Perform rendering in the graphical user interface, to obtain at least one virtual resource object.

Herein, the virtual resource object covers various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Operation 302: Perform rendering in the graphical user interface, to obtain at least one skill arc object when detecting a skill operation trigger gesture on at least one skill operation object deployed in a skill operation area in the graphical user interface, the skill arc object including M window locations for placing a skill object, and M being a positive integer.

Herein, in this embodiment, a skill arc is a part of the skill ring used in various embodiments.

Figure 7:
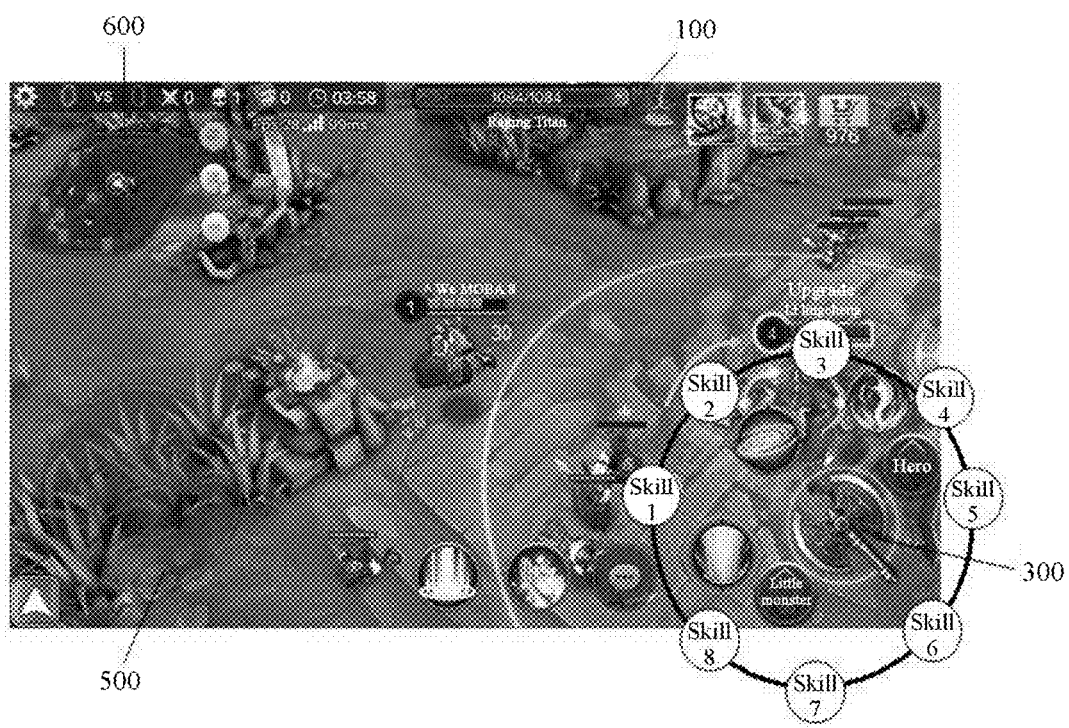

Herein, FIG. 7 is a schematic diagram of a UI. FIG. 7 includes: a graphical user interface 100, a skill object 300, a skill arc object, a function key object 500 for controlling a user to move and launch attach, and a mini map object 600 that can enable a current user to view deployment and layout of two parties in a large map shown in the graphical user interface. The skill arc object is a bar-shaped area including a skill object 1 to a skill object 8, and there are eight skill objects currently. Actually, only three skill objects (for example, window locations of skills 1 to 3 shown by solid lines in FIG. 7) are displayed in window locations of the skill arc object, and the remaining five skill objects (for example, locations of skills 4 to 8 shown by dashed lines in FIG. 7) are displayed in an extended manner with a slide operation of the user. If the user does not perform a slide operation, the remaining five skills are actually hidden and are not displayed in the window locations of the skill arc object. With reference to operation 303, only after a slide operation gesture on at least one skill arc object is detected, switching and display of N different skill objects that are sorted in order are triggered in the M window locations, where N is a positive integer, and N>M. For example, in the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. In FIG. 7, the window locations are set to the locations of the current skills 1 to 3. The location is randomly set according to a user requirement. For example, the window locations may also be set to locations of the current skill objects 4 to 6. A finger of the user is at the location of the skill object 4 and then slides to the left to display the hidden skill objects 1 to 3 in an extended manner, and then the user slides to the right to hide again the skills 1 to 3 that are displayed in an extended manner; or a finger of the user is at the location of the skill object 6 and then slides to the right to display the hidden skill objects 7 to 9 in an extended manner, and then, the user slides to the left to hide again the skills 7 to 9 that are displayed in an extended manner.

Herein, although a window location may be specifically set according to a user requirement randomly, after the window location is preset, the window location is a determined location on a screen, so that it is convenient for the user to rapidly and easily find the skill arc object.

Herein, with reference to operation 304, when a skill release operation gesture on at least one skill object currently displayed in the M window locations is detected, a skill release operation is performed on the at least one skill object. The example in FIG. 7 is still used for description. In the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. If the user slides to the right to display the hidden skill objects 4 to 8 and then releases the finger, skills corresponding to the skill objects 4 to 8 are released. Specific display may be that: the skill objects 4 to 8 are placed in the current three window locations, and the skill objects 1 to 3 that are displayed in the current three window locations before are replaced.

Figure 8:
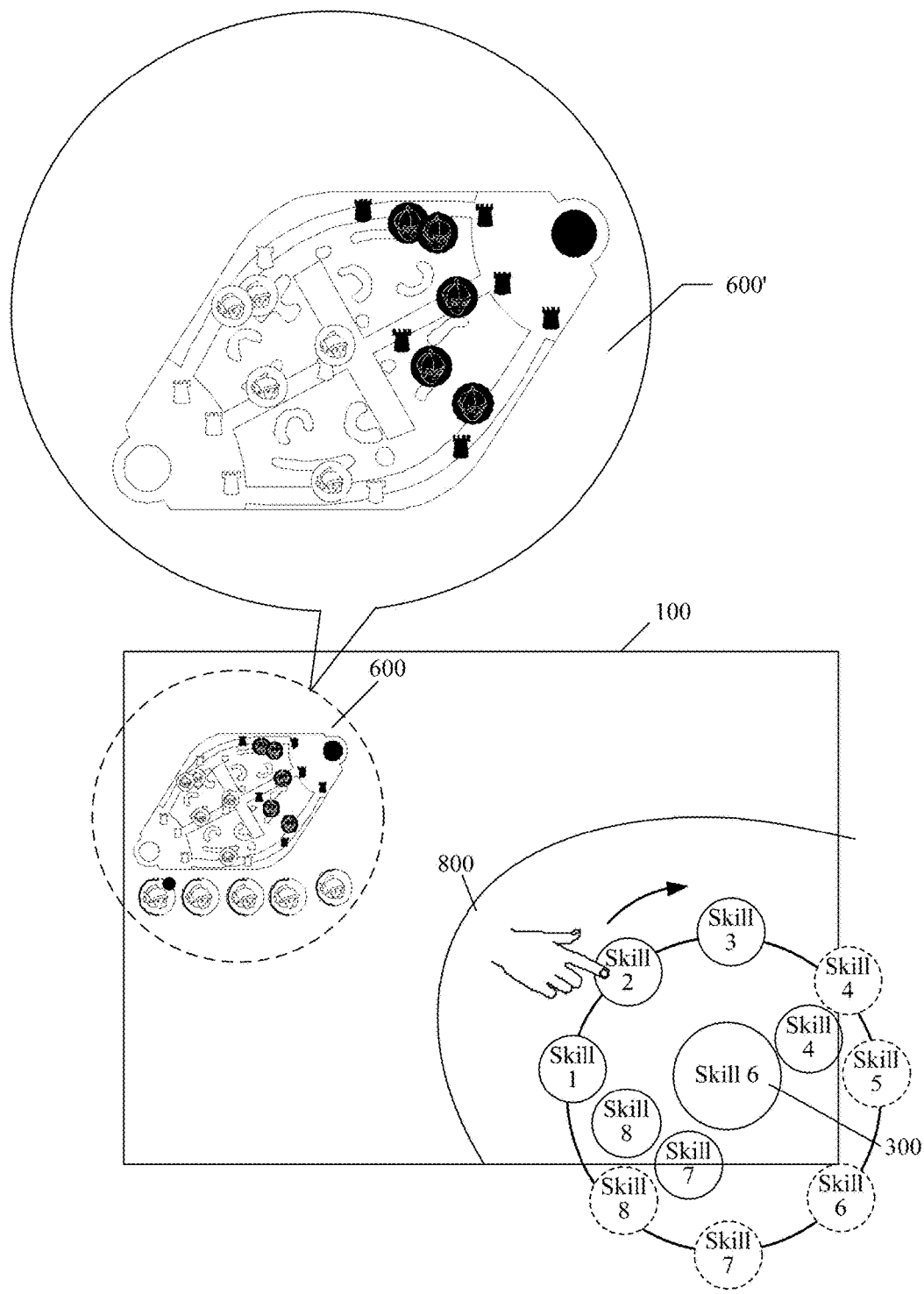

It is only a specific example. For example, a UI shown in FIG. 8 is another example. Different personnel deployment scenarios in a game are used for description, for example, numbers of deployed persons of two parties are 5 to 5. Versus modes displayed in a large map and a mini map are different. A one-to-one mode is a case in which numbers of deployed persons of two parties are both 1. Referring to the UI in FIG. 8, an only difference is numbers of deployed persons in the mini map in the UI. Details are not described herein, and details are provided subsequently.

Operation 303: Detect a slide operation gesture on the at least one skill arc object, and trigger switching and display of N different skill objects that are sorted in order in the M window locations, N being a positive integer, and N>M.

Operation 304: Perform, when detecting a skill release operation gesture on at least one skill object currently displayed in the M window locations, a skill release operation on the at least one skill object.

In an implementation of this embodiment of the present technology, the method further includes: setting a center point of the skill arc object as the skill operation object.

In an implementation of this embodiment of the present technology, the skill objects in the skill arc object are distributed in an annular shape; and the skill object includes preset icon information.

This embodiment of the present technology provides an information processing method. A software application is executed on a processor of a terminal and rendering is performed on a display of the terminal, to obtain a graphical user interface. The processor, the graphical user interface, and the software application are implemented in a game system. The method includes the following operations:

Operation 401: Perform rendering in the graphical user interface, to obtain at least one virtual resource object.

Herein, the virtual resource object covers various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Operation 402: Perform rendering in the graphical user interface, to obtain at least one skill arc object when detecting a skill operation trigger gesture on at least one skill operation object deployed in a skill operation area in the graphical user interface, the skill arc object including M window locations for placing a skill object, and M being a positive integer.

Herein, in this embodiment, a skill arc is a part of the skill ring used in various embodiments.

Herein, FIG. 7 is a schematic diagram of a UI. FIG. 7 includes: a graphical user interface 100, a skill object 300, a skill arc object, a function key object 500 for controlling a user to move and launch attach, and a mini map object 600 that can enable a current user to view deployment and layout of two parties in a large map shown in the graphical user interface. The skill arc object is a bar-shaped area including a skill object 1 to a skill object 8, and there are eight skill objects currently. Actually, only three skill objects (for example, window locations of skills 1 to 3 shown by solid lines in FIG. 7) are displayed in window locations of the skill arc object, and the remaining five skill objects (for example, locations of skills 4 to 8 shown by dashed lines in FIG. 7) are displayed in an extended manner with a slide operation of the user. If the user does not perform a slide operation, the remaining five skills are actually hidden and are not displayed in the window locations of the skill arc object. With reference to operation 403, only after a slide operation gesture on at least one skill arc object is detected, switching and display of N different skill objects that are sorted in order are triggered in the M window locations, where N is a positive integer, and N>M. For example, in the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. In FIG. 7, the window locations are set to the locations of the current skills 1 to 3. The location is randomly set according to a user requirement. For example, the window locations may also be set to locations of the current skill objects 4 to 6. A finger of the user is at the location of the skill object 4 and then slides to the left to display the hidden skill objects 1 to 3 in an extended manner, and then the user slides to the right to hide again the skills 1 to 3 that are displayed in an extended manner; or a finger of the user is at the location of the skill object 6 and then slides to the right to display the hidden skill objects 7 to 9 in an extended manner, and then, the user slides to the left to hide again the skills 7 to 9 that are displayed in an extended manner.

Herein, although a window location may be specifically set according to a user requirement randomly, after the window location is preset, the window location is a determined location on a screen, so that it is convenient for the user to rapidly and easily find the skill arc object.

Herein, with reference to operation 404, when a skill release operation gesture on at least one skill object currently displayed in the M window locations is detected, a skill release operation is performed on the at least one skill object. The example in FIG. 7 is still used for description. In the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. If the user slides to the right to display the hidden skill objects 4 to 8 and then releases the finger, skills corresponding to the skill objects 4 to 8 are released. Specific display may be that: the skill objects 4 to 8 are placed in the current three window locations, and the skill objects 1 to 3 that are displayed in the current three window locations before are replaced.

It is only a specific example. For example, a UI shown in FIG. 8 is another example. Different personnel deployment scenarios in a game are used for description, for example, numbers of deployed persons of two parties are 5 to 5. Versus modes displayed in a large map and a mini map are different. A one-to-one mode is a case in which numbers of deployed persons of two parties are both 1. Referring to the UI in FIG. 8, an only difference is numbers of deployed persons in the mini map in the UI. Details are not described herein, and details are provided subsequently.

Operation 403: Detect a slide operation gesture on the at least one skill arc object, and trigger switching and display of N different skill objects that are sorted in order in the M window locations, N being a positive integer, and N>M.

Operation 404: Enter a trajectory capturing mode of a slide operation to obtain a first movement direction of a slide trajectory, so as to determine M skill objects displayed on a slide trajectory corresponding to the first movement direction as target skill addition objects.

Operation 405: Determine, when detecting that the slide operation changes to a slide release state from a slide state, that it is a release operation currently, and place the M skill objects in the M window locations.

Herein, the skill objects are the skill objects 1 to 8 in the example in FIG. 7, and refer to specific skills. Corresponding skill objects that are displayed in an extended manner are released by means of operation 404 and operation 405.

In some embodiments, the method further includes: setting a center point of the skill arc object as the skill operation object.

In an implementation of this embodiment of the present technology, the method further includes: the skill objects in the skill arc object are distributed in an annular shape; and the skill object includes preset icon information.

In an implementation of this embodiment of the present technology, the method further includes:

obtaining, according to different target locations on the slide trajectory in the first movement direction, different target skill addition objects that are obtained in an extended display manner or a hidden display manner, to freely switch a skill in at least one target skill addition object. A corresponding UI is shown in FIG. 8. In the first movement direction, the right is first slid to, it is a five-to-five versus mode, and the window locations are the locations of the current skills 1 to 3. When the user slides to the right, the hidden skill objects 4 to 8 are displayed. If the user slides to the right to display the hidden skill objects 4 to 8 and then releases the finger, the skills corresponding to the skill objects 4 to 8 are released. In this case, skills released in the skill release area 800 include the skills 1 to 3 and further include the newly added skills 4 to 8 (all released skills are not displayed in the figure, and it is only an example). Then, in the first movement direction, the user slides to the left, to hide again the skills 4 to 8 that are displayed in an extended manner, and the initial locations of the current skills 1 to 3 are restored. The skills 4 to 8 that are displayed in an extended manner may also be hidden again, and are replaced in the window locations of the current skills 1 to 3, to display any three skill objects of the skills 4 to 8 by using the current window locations. As can be learned, a newly added skill object may be displayed in an extended manner or hidden with a slide operation of the user, so that it is convenient for the user to select a suitable skill from the skill arc object and release the skill, and multiple skill objects for selection by the user are placed without occupying a lot of locations on the screen.

In an implementation of this embodiment of the present technology, the M window locations are refreshed to M+j window locations after a quantity of window locations occupied by the skill arc object is adjusted according to collected user requirement information, where j is a positive integer greater than zero. For example, FIG. 3 is only an example. In this embodiment of the present technology, the quantity of window locations corresponding to the skill ring object is not limited to 8 and may be 9, 10, or 11, and is determined according to the size of the screen of the terminal of the user. The principle is that: window locations of the skill arc object should not occupy too much of the screen, and should be determined locations. After a default setting is completed, refreshing may be performed as in this implementation. For example, a user logs in to a game system by using a same account. The user plays a game by using a mobile phone at first, and then switches to a tablet computer to play the game. Because a screen of the tablet computer is larger than that of the mobile phone, if a quantity of windows that is set by default is 8 before, after the tablet computer is switched to, a quantity of windows in a UI of the game is 10 after refreshing.

This embodiment of the present technology provides an information processing method. A software application is executed on a processor of a terminal and rendering is performed on a display of the terminal, to obtain a graphical user interface. The processor, the graphical user interface, and the software application are implemented in a game system. The method includes the following operations:

Operation 501: Perform rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Operation 502: Perform rendering in the graphical user interface, to obtain at least one skill arc object when detecting a skill operation trigger gesture on at least one skill operation object deployed in a skill operation area in the graphical user interface, the skill arc object including M window locations for placing a skill object, and M being a positive integer.

Herein, in this embodiment, a skill arc is a part of the skill ring used in various embodiments.

Herein, FIG. 7 is a schematic diagram of a UI. FIG. 7 includes: a graphical user interface 100, a skill object 300, a skill arc object, a function key object 500 for controlling a user to move and launch attack, and a mini map object 600 that can enable a current user to view deployment and layout of two parties in a large map shown in the graphical user interface. The skill arc object is a bar-shaped area including a skill object 1 to a skill object 8, and there are eight skill objects currently. Actually, only three skill objects (for example, window locations of skills 1 to 3 shown by solid lines in FIG. 7) are displayed in window locations of the skill arc object, and the remaining five skill objects (for example, locations of skills 4 to 8 shown by dashed lines in FIG. 7) are displayed in an extended manner with a slide operation of the user. If the user does not perform a slide operation, the remaining five skills are actually hidden and are not displayed in the window locations of the skill arc object. With reference to operation 503, only after a slide operation gesture on at least one skill arc object is detected, switching and display of N different skill objects that are sorted in order are triggered in the M window locations, where N is a positive integer, and N>M. For example, in the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. In FIG. 7, the window locations are set to the locations of the current skills 1 to 3. The location is randomly set according to a user requirement. For example, the window locations may also be set to locations of the current skill objects 4 to 6. A finger of the user is at the location of the skill object 4 and then slides to the left to display the hidden skill objects 1 to 3 in an extended manner, and then the user slides to the right to hide again the skills 1 to 3 that are displayed in an extended manner; or a finger of the user is at the location of the skill object 6 and then slides to the right to display the hidden skill objects 7 to 9 in an extended manner, and then, the user slides to the left to hide again the skills 7 to 9 that are displayed in an extended manner.

Herein, although a window location may be specifically set according to a user requirement randomly, after the window location is preset, the window location is a determined location on a screen, so that it is convenient for the user to rapidly and easily find the skill arc object.

Herein, with reference to operation 504, when a skill release operation gesture on at least one skill object currently displayed in the M window locations is detected, a skill release operation is performed on the at least one skill object. The example in FIG. 7 is still used for description. In the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. If the user slides to the right to display the hidden skill objects 4 to 8 and then releases the finger, skills corresponding to the skill objects 4 to 8 are released. Specific display may be that: the skill objects 4 to 8 are placed in the current three window locations, and the skill objects 1 to 3 that are displayed in the current three window locations before are replaced.

It is only a specific example. For example, a UI shown in FIG. 8 is another example. Different personnel deployment scenarios in a game are used for description, for example, numbers of deployed persons of two parties are 5 to 5. Versus modes displayed in a large map and a mini map are different. A one-to-one mode is a case in which numbers of deployed persons of two parties are both 1. Referring to the UI in FIG. 8, an only difference is numbers of deployed persons in the mini map in the UI. Details are not described herein, and details are provided subsequently.

Operation 503: Detect a slide operation gesture on the at least one skill arc object, and trigger switching and display of N different skill objects that are sorted in order in the M window locations, N being a positive integer, and N>M.

Operation 504: Enter a trajectory capturing mode of a slide operation to obtain a second movement direction of a slide trajectory, so as to determine M skill operation objects displayed on a slide trajectory corresponding to the second movement direction as target skill addition objects.

Operation 505: Determine, when detecting that the slide operation changes to a slide release state from a slide state, that it is a release operation currently, and place the target skill addition objects in the M window locations.

Herein, the skill objects are the skill objects 1 to 8 in the example in FIG. 7, and refer to specific skills. Corresponding skill objects that are displayed in an extended manner are released by means of operation 504 and operation 505.

In an implementation of this embodiment of the present technology, the method further includes: setting a center point of the skill arc object as the skill operation object.

In an implementation of this embodiment of the present technology, the method further includes: the skill objects in the skill arc object are distributed in an annular shape; and the skill object includes preset icon information.

In an implementation of this embodiment of the present technology, the method further includes: obtaining, according to different target locations on the slide trajectory in the second movement direction, different target skill addition objects that are obtained in an extended display manner or a hidden display manner, to freely switch a skill in at least one target skill addition object.

In an implementation of this embodiment of the present technology, the M window locations are refreshed to M+j window locations after a quantity of window locations occupied by the skill arc object is adjusted according to collected user requirement information, where j is a positive integer greater than zero. For example, FIG. 3 is only an example. In this embodiment of the present technology, the quantity of window locations corresponding to the skill ring object is not limited to 8 and may be 9, 10, or 11, and is determined according to the size of the screen of the terminal of the user. The principle is that: window locations of the skill arc object should not occupy too much of the screen, and should be determined locations. After a default setting is completed, refreshing may be performed as in this implementation. For example, a user logs in to a game system by using a same account. The user plays a game by using a mobile phone at first, and then switches to a tablet computer to play the game. Because a screen of the tablet computer is larger than that of the mobile phone, if a quantity of windows that is set by default is 8 before, after the tablet computer is switched to, a quantity of windows in a UI of the game is 10 after refreshing.

As set forth above, conventional methods of providing game controls, in particular, of displaying skill/effect selection affordances, browsing through multiple effect selection affordances, selecting an effect selection affordance, adjusting a target position of an effect corresponding to a selected effect selection affordance and applying the effect to one or more target objects displayed in the game environment require separate gestures or inputs with different contacts detected at different times. The embodiments below integrate the different gestures such that the same contact may be used to provide the required inputs to accomplish multiple of the above operations. In some embodiments, different criteria related to the location and movement of a single contact, and optionally in conjunction with the state of the user interface (e.g., the game environment) at the time that various inputs by the single contact are detected are used to determine the responses of the user interface and the actions that will take place in the user interface.

In some embodiments, an information processing method includes: displaying, in a game user interface, a first game scene including at least one game character (e.g., the game character corresponding to the current user of the device, or a game character on an opposing side of the game); displaying a skill selection object (e.g., a skill ring object, or skill arc object) in the game user interface, the skill selection object including a plurality skill slots (e.g., window locations); determining a set of deployable skills corresponding to the first game scene, wherein a total number and types of skills included the set of deployable skills are dynamically determined based on a predefined set of characteristics of the first game scene; and distributing the set of deployable skills into one or more of the plurality of skill slots in the skill selection object, wherein a corresponding skill is deployed in the first game scene when selected by a user from the one or more of the plurality of skill slots in the skill selection object. In some embodiments, there are more skills in the set than the number of slots visible on the skill selection object, and sometimes there are fewer skills than the number of slots.

In some embodiments, displaying the skill selection object in the game user interface includes displaying the skill selection object with the plurality of skill slots distributed around a game character corresponding to a game player controlling the device. In some embodiments, displaying the skill selection object in the game user interface includes: displaying the skill selection object in a first state with the plurality of skill slots retracted (e.g., with only the center of the skill selection object visible initially); and while displaying the skill selection object in the first state, detecting a first user input directed to the skill selection object (e.g., a touch on the center of the skill selection object); and in response to receiving the first user input directed to the skill selection object displayed in the first, displaying the skill selection object in a second state with the plurality of skill slots expanded around a center of the skill selection object.

In some embodiments, the set of deployable skills corresponding to the first game scene includes a number of skills that is greater than a number of skill slots in the skill selection object, and wherein the method further includes: while displaying a first subset of the set of deployable skills in the plurality of skill slots of the skill selection object, detecting a second user input including a swipe gesture in a first direction on the skill selection object; and in response to detecting the second user input, scrolling the skill selection object to display a second subset of the set of deployable skills in the plurality of skill slots, wherein the second subset of the set of deployable skills include at least one skill that was not included in the first subset of the set of deployable skills. For example, when a swipe gesture is detected near the skill/effect selection object, the skill/effect selection object is rotated, or the set of deployable skills are moved through the slots in the skill/effect selection object, and at least one previously unslotted skill is moved into a slot and become visible, and at least one previously slotted skill is moved out of the slot and becomes invisible.

In some embodiments, the set of deployable skills corresponding to the first game scene includes a number of skills that is greater than a number of skill slots in the skill selection object, and wherein the method further includes: while displaying a first subset of the set of deployable skills in the plurality of skill slots of the skill selection object, detecting a second user input including a swipe gesture in a first direction on the skill selection object; and in response to detecting the second user input, scrolling the skill selection object to display a second subset of the set of deployable skills in the plurality of skill slots, wherein the second subset of the set of deployable skills include at least one skill that was not included in the first subset of the set of deployable skills.

In some embodiments, displaying the skill selection object in the game user interface includes displaying the skill selection object at a location on the first game scene in accordance with a touch location of an input object on a touch-sensitive display of the device.

In some embodiments, at least one of the skill slot includes sub-slots that are displayed when the at least one skill slot is selected by a user, and wherein a total number of sub-slots included for the at least one skill slot depends on a respective skill that is currently distributed to the at least one skill slot. For example, a slot may be occupied by a category of skills or effects, and the sub-slots for that slot are occupied specific skills in that skill category.

In some embodiments, a contact is detected on a touch-screen at a location of a button representing the unexpanded skill selection object, and in response to detecting the contact on the button, an effect selection panel with a ring of slots is displayed around the contact. In some embodiments, the effect selection panel includes a plurality of effect selection affordances representing different effects, such as skills, items, actions, attacks, etc. that are available for use in the current gaming context by the currently chosen character of the player. The affordances are icons placed in the slots. In some embodiments, a representation of the player (e.g., a character or avatar controlled by the player, or a weapon or vehicle that is currently controlled by the player, etc.) is also shown in the interaction region (e.g., a game scene). In some embodiments, the effect selection panel includes a circular menu of effect selection affordances for different skills 1 through x. In some embodiments, a method for selecting a game character for the player is also provided in a similar manner as the effect selection process. Although FIGS. 1A-1C illustrate the contact being detected after the button is already displayed, in some embodiments, if the button is not already displayed, detecting the contact at a predefined location in the user interface or detecting an input by the contact that meets button display criteria (e.g., a touch-hold requirement or a press requirement is met by the contact when no panel-display affordance is displayed) causes display of the button. In some embodiments, lift-off of the contact is not required to display the button, and when a subsequent input by another contact meets panel display criteria (e.g., another touch-hold requirement or another press requirement while the button is displayed), the effect selection panel is displayed. In some embodiments, the effect selection panel is arranged according to other formats, such as a grid or a list.

In some embodiments, while the contact is maintained on the touch-screen after the effect selection panel is displayed, movement of the contact across the touch-screen is detected. In some embodiments, movement in the upper right direction (northeast direction) of a reference location (e.g., the location of the button or the initial location of the contact) causes effect selection panel to scroll in a first direction (e.g., clockwise). In some embodiments, while the contact is maintained on the touch-screen after the effect selection panel is displayed, movement of contact across the touch-screen in the upper left direction (northwest direction) of the reference location causes the effect selection panel to scroll in a second direction (e.g., counterclockwise). In some embodiments, the movement of the contact can be a rotation around a centroid of the contact, and a clockwise rotation of the contact causes the effect selection panel to scroll in a first direction (e.g., clockwise, or upward), and a counterclockwise rotation of the contact causes the effect selection panel to scroll in the opposite direction (e.g., counterclockwise, or downward). In some embodiments, the movement of the contact can be a rotation around a reference point outside of the contact, e.g., within the region enclosed by the inner boundary of the circular ring of effect selection affordances.

In some embodiments. the device displays the effect selection panel, e.g., in response to a predefined input by a contact or gesture. After the effect selection panel is displayed, the device determines whether the same contact is now detected over an effect selection affordance in the effect selection panel. In some embodiments, if display of the effect selection panel is maintained without requiring a continuously maintained contact, the device simply determines whether a contact is detected over an effect selection affordance, and does not require the contact to be the same contact that triggered the display of the effect selection panel in the first place. If the device determines that the contact is not currently detected within the effect selection panel, then the device determines whether the contact is currently detected outside of the effect selection panel. If the device determines that the contact is currently detected outside of the effect selection panel, the device ends the process, and optionally ceases to display the effect selection panel. If the device determines that the contact is currently detected within the effect selection panel, the device continues to monitor the movement of the contact and determines whether the contact is currently detected on an effect selection affordance within the effect selection panel. If the device determines that the contact is currently detected on an effect selection affordance within the effect selection panel, the device selects the effect selection affordance (e.g., in accordance with time or intensity requirement), and adjusts the position/line/area of effect and identifies target objects in the interaction region in accordance with movement of the contact. The device then determines whether lift-off of the contact is detected while one or more target objects are selected. If the device determines that lift-off of the contact is detected while one or more target objects are selected, the device applies the selected effect to the selected target objects, and the process ends. If the device determines that lift-off of the contact is detected before one or more target objects are selected or when no target objects are selected, the device determines whether the contact has moved to the cancelation affordance when lift-off of the contact is detected. In some embodiments, if the device determines that the contact has not moved to the cancelation affordance when lift-off of the contact is detected, the device still applies the selected effect to the last selected target objects. If the device determines that the contact has moved to the cancellation affordance when lift-off of the contact is detected, the device forgoing application of the selected effect and ends the process.

In some embodiments, a method of providing game controls (e.g., displaying, browsing, selecting and applying effects to game objects), in accordance with some embodiments is performed at an electronic device with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in the method are, optionally, combined and/or the order of some operations is, optionally, changed.

In some embodiments, the device displays a user interface of a first application (e.g., a gaming application for a role playing game, a board game, a one person shooter game, a strategy game, etc.), including displaying an interaction region (e.g., a game board or a scene in a game) that includes one or more objects (e.g., game characters, creatures, enemies, treasures, inanimate objects, items, puzzles, game pieces, etc.). In some embodiments, the one or more objects (e.g., hostile characters, friendly characters, and neutral characters) have predefined characteristics and behaviors, and move and/or change their appearances and/or actions in accordance with what is happening within the interaction region and predefined game rules and logic. In some embodiments, some objects may disappear or move out of the interaction region (e.g., the visible portion of the user interface or game scene) and additional objects may appear in the interaction region, for example, as a result of what is happening within the interaction region and/or predefined game rules and logic. In some embodiments, the background of the interaction region is an animated game scene, and the game scene evolves in accordance with predefined storyline, game rules and logic, and/or the interactions that are occurring in the interaction region.

While displaying the interaction region (e.g., a game scene), the device displays an effect selection panel that includes a plurality of effect selection affordances that correspond to different predefined effects (e.g., a type of attack, a type of skill, a type of effect, a type of status, a type of ability, etc.) that are applicable to one or more of the interaction objects currently displayed in the interaction region (e.g., to cause a change in the actions, states, status, abilities, behaviors, characteristics, and/or appearances of the interactive objects that are eligible targets of the selected effect(s) and are within the line of effect (LOE) (or position of effect, or area of effect) of the selected effects). In some embodiments, the effect selection panel is displayed in response to an input (e.g., a selection of a predefined affordance that is concurrently displayed with the interaction region, or detection of a contact in a predefined region of the display, detection of a predefined gesture by a contact, etc.). In some embodiment, the effect selection panel is displayed as part of the user interface without requiring any user input.

In some embodiments, while displaying the interaction region, the device detects a sequence of one or more inputs, wherein detecting the sequence of one or more inputs includes detecting a first contact on the touch-sensitive surface, and detecting movement of the first contact across the touch-sensitive surface. In response to detecting the sequence of one or more inputs: in accordance with a determination that the sequence of one or more inputs meets effect selection criteria with respect to a first effect selection affordance of the plurality of effect selection affordance, the device displays a first visual indication that indicates selection of the first effect selection affordance (e.g., displaying the first visual indication includes highlighting the first effect selection affordance, and/or ceasing to display other effect selection affordances while maintaining display of the first effect selection affordance or a variant thereof (e.g., when the first effect selection affordance is selected, a first effect corresponding to the first selection affordance becomes ready for application on one or more target objects upon subsequent detection of an activation input); and in accordance with a determination that effect adjustment criteria are met with respect to a first effect (e.g., "Skill 3") corresponding to the first effect selection affordance, wherein the effect adjustment criteria require that, while the first effect selection affordance remains selected (e.g., after the first effect selection affordance is selected in response to an earlier selection input by the first contact), the first contact moves across the touch-sensitive surface from the first location to a second location that is different from the first location (e.g., movement away from the first selection affordance after the first selection affordance has been selected by the first contact) in order for the effect adjustment criteria to be met, the device displays a second visual indication to indicate adjustment of an effect position corresponding to the first effect in accordance with the movement of the first contact from the first location to the second location (e.g., as indicated by movement of a visible line of effect or movement of a zone or area of effect (e.g., a spotlight defining the region within which an eligible target object will be affected by the first effect when the activation input is detected)). In some embodiments, in accordance with a determination that the effect adjustment criteria are not met with respect to the first effect (e.g., when the first effect selection affordance was not selected by the first contact before the first contact moved from the first location to the second location, or when the first contact did not move after the selecting the first effect selection affordance), the device forgoes displaying the second visual effect to indicate the adjustment of the effect position corresponding to the first effect in accordance with the movement of the first contact from the first location to the second location. For example, if movement of the first contact is detected while the first effect selection affordance is not selected, the device may move the focus selector (e.g., the first contact or a visual indication of the first contact on the display) from the first effect selection affordance to another effect selection affordance in accordance with the movement of the first contact. In some embodiments, the selection affordance under the focus selector is highlighted in a manner (e.g., highlighted in a different manner from the highlighting of the effect selection affordance in a selected state) to indicate a pre-selection state of the selection affordance. A pre-selected effect selection affordance becomes selected when the effect selection criteria are met with respect to the pre-selected effect selection affordance.

In some embodiments, prior to displaying the effect selection panel, the device displays, in the user interface of the first application, a panel-display affordance (e.g., displaying a game effect icon overlaid on the interaction region), wherein the panel-display affordance corresponds to the effect selection panel, wherein: detecting the sequence of one or more inputs includes detecting the first contact at a location on the touch-sensitive surface that corresponds to the panel-display affordance (e.g., detecting initial touch-down of the first contact over the panel-display affordance, and detecting first movement of the first contact from the location that corresponds to the panel-display affordance to the first location that corresponds to the first effect selection affordance (e.g., the first contact is continuously maintained on the touch-sensitive surface when triggering the display of the effect selection panel, selecting the first effect selection affordance after the effect selection panel is displayed, and adjusting the first effect after selection of the first effect selection affordance). The effect selection panel is displayed in response to detecting the first contact at the location on the touch-sensitive surface that corresponds to the panel-display affordance (e.g., before the lift-off or movement of the first contact is detected, and while the first contact is continuously maintained on the touch-screen). In some embodiments, the effect selection panel is displayed in response to the first contact being maintained at its initial touch-down location with less than a threshold amount of movement for at least a threshold amount of time (e.g., a touch-hold requirement is met by the contact while the contact is detected on the button). In some embodiments, the effect selection panel is displayed after the first contact moves from its initial touch-down location to the panel-display affordance (e.g., the button) and is maintained over the panel-display affordance with less than a threshold amount of movement for more than a threshold amount of time. In some embodiments, the requirement for holding the first contact over the panel-display affordance for at least a threshold amount of time is replaced with a requirement for pressing on the panel-display affordance with an intensity exceeding a predefined press intensity threshold (e.g., an intensity threshold greater than the contact detection intensity threshold). In some embodiments, if the initial touch-down location of the first contact is not at a location that corresponds to the panel-display affordance, the device forgoes displaying the effect selection panel. In some embodiments, if the panel-display criteria are not met (e.g., the first contact is not maintained over the panel-display affordance with less than the predefined amount of time, or the intensity of the first contact did not exceed the required press intensity threshold while the first contact is detected over the panel-display affordance), the device forgoes displaying the effect selection panel.

In some embodiments, in response to detecting the sequence of one or more inputs: in accordance with the determination that the sequence of one or more inputs meets the effect selection criteria with respect to the first effect selection affordance of the plurality of selection affordances, the device displays a third visual indication that indicates at least one target object of the first effect that corresponds to the first effect selection affordance, wherein the at least one target object is selected from one or more objects currently visible in the interaction region in accordance with predefined target selection criteria corresponding to the first effect. In some embodiments, the predefined target selection criteria corresponding to the first effect specifies a maximum number of concurrently selected targets for the first effect (e.g., a single target at a time, or a maximum of five targets at a time, or a single row of targets at a time, etc.). In some embodiments, the predefined target selection criteria require that only certain types of objects (e.g., only certain types of characters, creatures, enemies, allies, items, and/or game objects, etc.) are eligible targets for the first effect. In some embodiments, the predefined target selection criteria require that only eligible targets within a threshold range of a reference location (e.g., the location of the first contact, or the location of the character, weapon, or item that is currently controlled by the user) can be selected as targets of the first effect. In some embodiments, the predefined target selection criteria select one or more targets in accordance with a set of default rules when the first effect selection affordance becomes selected by the first contact. For example, upon selection of the first effect selection affordance, one or more objects that are eligible targets for the first effect (e.g., of the object type(s) that can be affected by the first effect) and that are closest to a predefined reference location (e.g., the location of the first contact or the location of the character/weapon/game object that is currently controlled by the user) become selected as the initial targets for the first effect by default (e.g., before any movement of the first contact is detected to adjust the effect position of the first effect).

In some embodiments, displaying the second visual indication to indicate adjustment of the effect position corresponding to the first effect in accordance with the movement of the first contact from the first location to the second location includes one or more of: (1) moving a line of effect corresponding to the first effect in accordance with the movement of the first contact from the first location to the second location; (2) changing a size and/or location of a zone of effect corresponding to the first effect in accordance with the movement of the first contact from the first location to the second location; and (3) changing an identity and/or count of the currently selected targets for the first effect in accordance with the movement of the first contact from the first location to the second location. In some embodiments, moving the first contact changes the direction of the line of effect (e.g., the direction of the line of effect rotates around the predefined reference location in accordance with movement of the first contact in the clockwise or counter-clockwise direction). In some embodiments, moving the first contact changes the position of the zone of effect of the first effect (e.g., the zone of effect moves in a direction in accordance with the movement direction and movement distance of the first contact). In some embodiments, moving the first contact expands or contracts the zone of effect of the first effect (e.g., the zone of effect expands or contracts in accordance with the movement direction and movement distance of the first contact). In some embodiments, as a result of moving the line of effect or changing the location and/or size of the zone of effect of the first effect in accordance with the movement of the first contact, different objects and/or different number of objects in the interaction region become selected as targets for the first effect. In some embodiments, the line of effect or zone of effect of the first effect is visually indicated in the interaction region. In some embodiments, the line of effect or zone of effect are visibly indicated in the interaction region, and the currently selected target objects are visually identified in the interaction region.

In some embodiments, the effect selection criteria include a criterion that is met when the first contact is detected at the first location on the touch-sensitive surface that corresponds to the first effect selection affordance (e.g., when detecting the first contact at the first location includes detecting the first contact at the first location upon touch-down of the first contact when the effect selection panel is already displayed in the user interface, or detecting touch-down of the first contact at an initial location (e.g., at a location that corresponds to an affordance (e.g., the button) for triggering display of the effect selection panel) that is different from the first location, and detecting movement of the first contact from its initial touch-down location to the first location (e.g., the location that corresponds to the first effect selection affordance in the effect selection panel)). In some embodiments, the effect selection criteria are met with respect to the first effect selection affordance when the first contact is detected over the first effect selection affordance in the effect selection panel with less than a threshold amount of movement for at least a threshold amount time, or when an increase in intensity of the first contact exceeds a predefined press intensity threshold while the first contact is detected over the first effect selection affordance in the effect selection panel). In some embodiments, in accordance with a determination that the sequence of one or more inputs does not meet the effect selection criteria with respect to the first effect selection affordance, the device forgoes displaying the first visual indication that indicates the selection of the first effect selection affordance. For example, the effect selection criteria are not met (1) when the first contact is not detected over the first effect selection affordance with less than the threshold amount of movement for at least the threshold amount of time (e.g., when the movement path of the first contact never overlapped with the first effect selection affordance, or when the first contact merely went past the first effect selection affordance but did not remain over the first effect selection affordance for the threshold amount of time) and the effect selection criteria require a touch-hold input to be detected over a respective effect selection affordance, or (2) when the first contact merely remained over the first effect selection affordance but did not meet the required press intensity threshold and the effect selection criteria require a press input to be detected over a respective effect selection affordance.

In some embodiments, detecting the sequence of one or more inputs includes detecting initial movement of the first contact while the effect selection panel is displayed, and the effect selection criteria include a criterion that is met when an initial movement of the first contact (e.g., movement of the first contact that was detected before the first effect selection affordance becomes selected) causes the first effect selection affordance to be moved from an initial display location of the first effect selection affordance across the display to a predefined affordance selection region of the effect selection panel.

In some embodiments, detecting the sequence of one or more inputs include detecting initial movement of the first contact while the effect selection panel is displayed, and the method includes: in response to detecting the initial movement of the first contact: in accordance with a determination that the initial movement of the first contact meets first movement criteria (e.g., the first movement criteria require that the initial movement of the first contact is in a first movement direction (e.g., with increasing absolute x value in the positive x direction accompanied by increasing absolute y value in the positive y direction or increasing absolute y value in the negative y direction relative to the touch-down location of the first contact)), scrolling the plurality of effect selection affordances in the effect selection panel in a first scroll direction (e.g., rotating a circular arrangement of the plurality of effect selection affordances in the effect selection panel in a clockwise direction (or counter-clockwise direction), or moving a vertical or horizontal list of the plurality of effect selection affordances in the effect selection panel in upward (or downward) or leftward (or rightward)); and in accordance with a determination that the initial movement of the first contact meets second movement criteria that are distinct from the first movement criteria (e.g., the second movement criteria require that the initial movement of the first contact is in a second movement direction (e.g., with increasing absolute x value in the negative x direction accompanied by increasing absolute y value in the positive y direction or increasing absolute y value in the negative y direction relative to the touch-down location of the first contact)), scrolling the plurality of effect selection affordances in the effect selection panel in a second scroll direction that is opposite the first scroll direction (e.g., rotating the circular arrangement of the plurality of effect selection affordances in the effect selection panel in a counter-clockwise direction (or clockwise direction), or moving a vertical or horizontal list of the plurality of effect selection affordances in the effect selection panel in downward (or upward) or rightward (or leftward)).

In some embodiments, detecting the sequence of one or more inputs includes detecting lift-off of the first contact, and the method includes: in response to detecting the lift-off of the first contact: in accordance with a determination that effect application criteria are met with respect to the first effect by the sequence of one or more inputs, wherein the effect application criteria require that the lift-off of the first contact is detected while the first effect selection affordance is selected and while at least one target is currently identified in the interaction region for the first effect in order for the effect application criteria to be met with respect to the first effect, applying the first effect to the at least one target that is currently identified in the interaction region (e.g., releasing an attack, or skill, or status that corresponds to the first effect selection affordance to the interactive object(s) that are selected as the target(s) for the first effect at the time that the lift-off of the first contact is detected); and in accordance with a determination that effect cancelation criteria are met with respect to the first effect by the sequence of one or more inputs, wherein the effect cancelation criteria require that the lift-off of the first contact is detected while the effect application affordance is no longer selected or while no target is currently identified in the interaction region (e.g., for the first effect or any other effect) in order for the effect cancelation criteria to be met, forgoing application of the first effect that corresponds to the first effect selection affordance. In some embodiments, after lift-off of the first contact is detected, the device ceases to display the first effect selection affordance and, optionally, the effect selection panel (if the effect selection panel was displayed in response to detection of the first contact).

Various details disclosed herein with respect to different embodiments may be combined without limitation, and the features of each embodiment are not exhaustively repeated when the features are described with respect to other embodiments in the interest of brevity.

Figure 9:
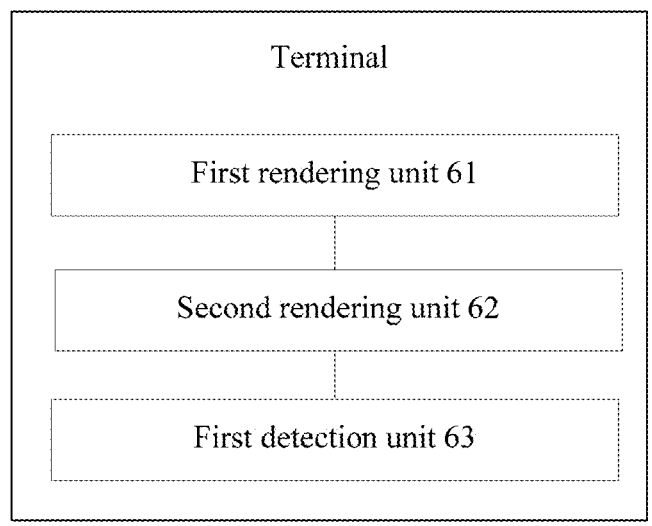
FIG. 9 is a schematic flowchart of a method according to some embodiments of the present technology.

This embodiment of the present technology provides a terminal. A software application is executed on a processor of the terminal and rendering is performed on a display of the terminal, to obtain a graphical user interface. The processor, the graphical user interface, and the software application are implemented in a game system. As shown in FIG. 9, the terminal includes:

a first rendering unit 61, configured to perform rendering in the graphical user interface, to obtain at least one virtual resource object;

a second rendering unit 62, configured to: perform rendering in the graphical user interface, to obtain a skill ring object when a skill operation trigger gesture on at least one skill operation object deployed in a skill operation area in the graphical user interface is detected, the skill ring object including M window locations for placing a skill object, and M being a positive integer; and a first detection unit 63, configured to perform, when detecting a skill release operation gesture on at least one skill object in the M window locations, a skill release operation on the at least one skill object.

In an actual application of the embodiments of the present technology, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Herein, FIG. 3 is a schematic diagram of a UI. FIG. 3 includes: a graphical user interface 100, a skill object 300, a skill ring object formed by an annular area including a skill object 1 to a skill object 8, a function key object 500 for controlling a user to move and launch attach, and a mini map object 600 that can enable a current user to view deployment and layout of two parties in a large map shown in the graphical user interface. The skill ring object includes eight window locations for placing a skill object. One skill object is placed in each window location, and currently, eight skill objects are placed in total.

Herein, although a window location may be specifically set according to a user requirement randomly, after the window location is preset, the window location is a determined location on a screen, so that it is convenient for the user to rapidly and easily find the skill ring object.

Herein, a skill release operation on the at least one skill object is performed when a skill release operation gesture on at least one skill object in the M window locations is detected. The example in FIG. 3 is still used for description.

In the current UI shown in FIG. 3, N is 8 currently, M is 8 currently, and the two are the same in value. The user may perform skill release by means of a touch or slide operation. Skill release by means of a slide operation is shown in FIG. 3, for example, the user drags a skill 2 to a skill ring and then performs skill release. For another examples, the user touches a skill 5 and then performs skill release.

Herein, it should be noted that, the UI shown in FIG. 3 obtained through rendering by a processor of a terminal device, which is specifically an image processor is only a specific example. For example, a UI shown in FIG. 4 is another example. Different personnel deployment scenarios in a game are used for description, for example, numbers of deployed persons of two parties are 3 to 3. Versus modes displayed in a large map and a mini map are different, are not limited to 3 to 3, and may be 5 to 5 or versus modes in which numbers of deployed persons of two parties are different, such as 20 to 40 or 30 to 60. When numbers of deployed persons of two parties are the same, a one-to-one mode is a case in which numbers of deployed persons of two parties are both 1. Referring to the UI in FIG. 4, an only difference is numbers of deployed persons in the mini map in the UI. Details are not described herein, and details are provided subsequently.

In an implementation of this embodiment of the present technology, the terminal further includes: setting a center point of the skill ring object as the skill operation object.

In an implementation of this embodiment of the present technology, the skill objects in the skill ring are distributed in an annular shape; and the skill object includes preset icon information.

In an implementation of this embodiment of the present technology, the terminal further includes: a display trigger unit, configured to: obtain a touch operation on the skill ring object, and trigger display of M skill objects that are sorted in a preset order in the preset M window locations.

In an implementation of this embodiment of the present technology, the first detection unit is further configured to: select, when detecting that the touch operation is separately applied to at least one skill object in the M skill objects, the at least one skill object, and determine the at least one skill object as a target skill addition object and release the at least one skill object.

In an implementation of this embodiment of the present technology, the terminal further includes: a window quantity refreshing unit, configured to: refresh the M window locations to M+j window locations after a quantity of window locations occupied by the skill ring object is adjusted according to collected user requirement information, where j is a positive integer greater than zero.

This embodiment of the present technology provides a terminal. A software application is executed on a processor of the terminal and rendering is performed on a display of the terminal, to obtain a graphical user interface. The processor, the graphical user interface, and the software application are implemented in a game system. The terminal includes:

a first rendering unit 71, configured to perform rendering in the graphical user interface, to obtain at least one virtual resource object;

a second rendering unit 72, configured to: perform rendering in the graphical user interface, to obtain at least one skill arc object when a skill operation trigger gesture on at least one skill operation object deployed in a skill operation area in the graphical user interface is detected, the skill arc object including M window locations for placing a skill object, and M being a positive integer; and a first detection unit 73, configured to: detect a slide operation gesture on the at least one skill arc object, and trigger switching and display of N different skill objects that are sorted in order in the M window locations, N being a positive integer, and N>M; and a second detection unit 74, configured to perform, when detecting a skill release operation gesture on at least one skill object currently displayed in the M window locations, a skill release operation on the at least one skill object.

In an actual application of the embodiments of the present technology, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present technology.

Herein, in this embodiment, a skill arc is a part of the skill ring used in various embodiments.

Herein, FIG. 7 is a schematic diagram of a UI. FIG. 7 includes: a graphical user interface 100, a skill object 300, a skill arc object, a function key object 500 for controlling a user to move and launch attach, and a mini map object 600 that can enable a current user to view deployment and layout of two parties in a large map shown in the graphical user interface. The skill arc object is a bar-shaped area including a skill object 1 to a skill object 8, and there are eight skill objects currently. Actually, only three skill objects (for example, window locations of skills 1 to 3 shown by solid lines in FIG. 7) are displayed in window locations of the skill arc object, and the remaining five skill objects (for example, locations of skills 4 to 8 shown by dashed lines in FIG. 7) are displayed in an extended manner with a slide operation of the user. If the user does not perform a slide operation, the remaining five skills are actually hidden and are not displayed in the window locations of the skill arc object. Only after a slide operation gesture on at least one skill arc object is detected, switching and display of N different skill objects that are sorted in order are triggered in the M window locations, where N is a positive integer, and N>M. For example, in the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. In FIG. 7, the window locations are set to the locations of the current skills 1 to 3. The location is randomly set according to a user requirement. For example, the window locations may also be set to locations of the current skill objects 4 to 6. A finger of the user is at the location of the skill object 4 and then slides to the left to display the hidden skill objects 1 to 3 in an extended manner, and then the user slides to the right to hide again the skills 1 to 3 that are displayed in an extended manner; or a finger of the user is at the location of the skill object 6 and then slides to the right to display the hidden skill objects 7 to 9 in an extended manner, and then, the user slides to the left to hide again the skills 7 to 9 that are displayed in an extended manner.

Herein, although a window location may be specifically set according to a user requirement randomly, after the window location is preset, the window location is a determined location on a screen, so that it is convenient for the user to rapidly and easily find the skill arc object.

Herein, when a skill release operation gesture on at least one skill object currently displayed in the M window locations is detected, a skill release operation is performed on the at least one skill object. The example in FIG. 7 is still used for description. In the current UI shown in FIG. 7, N is 8 currently, and M is 3 currently. For example, the window locations are locations of the current skills 1 to 3. When the user slides to the right, the hidden skill objects 4 to 8 are displayed. For example, when the user slides to the left, the skills 4 to 8 that are displayed in an extended manner are hidden again. If the user slides to the right to display the hidden skill objects 4 to 8 and then releases the finger, skills corresponding to the skill objects 4 to 8 are released. Specific display may be that: the skill objects 4 to 8 are placed in the current three window locations, and the skill objects 1 to 3 that are displayed in the current three window locations before are replaced.

It is only a specific example. For example, a UI shown in FIG. 8 is another example. Different personnel deployment scenarios in a game are used for description, for example, numbers of deployed persons of two parties are 5 to 5. Versus modes displayed in a large map and a mini map are different. A one-to-one mode is a case in which numbers of deployed persons of two parties are both 1. Referring to the UI in FIG. 8, an only difference is numbers of deployed persons in the mini map in the UI. Details are not described herein, and details are provided subsequently.

In an implementation of this embodiment of the present technology, the terminal further includes: setting a center point of the skill arc object as the skill operation object.

In an implementation of this embodiment of the present technology, the skill objects in the skill arc object are distributed in an annular shape. The skill object includes preset icon information.

In an implementation of this embodiment of the present technology, the second detection unit is further configured to: enter a trajectory capturing mode of a slide operation to obtain a first movement direction of a slide trajectory, so as to determine M skill operation objects displayed on a slide trajectory corresponding to the first movement direction as target skill addition objects; and determine, when detecting that the slide operation changes to a slide release state from a slide state, that it is a release operation currently, and place the target skill addition objects in the M window locations and release the target skill addition objects.

In an implementation of this embodiment of the present technology, the terminal further includes: a display switching unit, configured to obtain, according to different target locations on the slide trajectory in the first movement direction, different target skill addition objects that are obtained in an extended display manner or a hidden display manner, to freely switch a skill in at least one target skill addition object.

In an implementation of this embodiment of the present technology, the second detection unit is further configured to: enter a trajectory capturing mode of a slide operation to obtain a second movement direction of a slide trajectory, so as to determine M skill operation objects displayed on a slide trajectory corresponding to the second movement direction as target skill addition objects; and determine, when detecting that the slide operation changes to a slide release state from a slide state, that it is a release operation currently, and place the target skill addition objects in the M window locations.

In an implementation of this embodiment of the present technology, the terminal further includes: a display switching unit, configured to obtain, according to different target locations on the slide trajectory in the second movement direction, different target skill addition objects that are obtained in an extended display manner or a hidden display manner, to freely switch a skill in at least one target skill addition object.

In an implementation of this embodiment of the present technology, the terminal further includes: a window quantity refreshing unit, configured to: refresh the M window locations to M+j window locations after a quantity of window locations occupied by the skill arc object is adjusted according to collected user requirement information, where j is a positive integer greater than zero.

Figure 10:
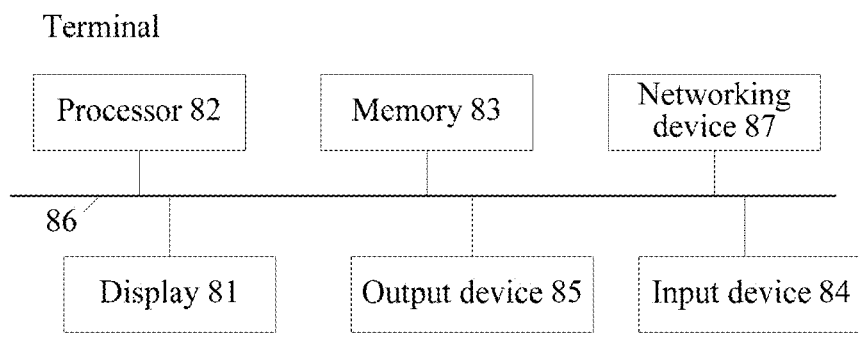
FIG. 10 is a schematic structural diagram of hardware entities according to some embodiments of the present technology.

This embodiment of the present technology provides a terminal. As shown in FIG. 10, the terminal includes: a display 81 and a processor 82. The display 81 is configured to: execute a software application on the processor of the terminal and then perform rendering on the software application, to obtain a graphical user interface. The graphical user interface is configured to facilitate control processing in man-machine interaction. The processor 82 is configured to perform the information processing method in the embodiments of the present technology. The processor, the graphical user interface, and the software application are implemented in a game system.

In this embodiment, the terminal further includes: a memory 83, an input device 84 (for example, a peripheral device such as a collection device including a camera, a microphone, and a headset; a mouse, a joystick, or a desktop computer keyboard; or a physical keyboard or a touchscreen on a notebook computer or a tablet computer), an output device 85 (for example, an audio output device or a video output device including a speaker, a headset, and the like), a bus 86, and a networking device 87. The processor 82, the memory 83, the input device 84, the display 81, and the networking device 87 are connected by using the bus 86, and the bus 86 is used for data transmission and communication between the processor 82, the memory 83, the display 81, and the networking device 87.

The input device 84 is mainly configured to obtain an input operation of a user, and the input device 84 may vary with the terminal. For example, when the terminal is a PC, the input device 84 may be an input device such as a mouse or a keyboard; when the terminal is portable device such as a smartphone or a tablet computer, the input device 64 may be a touchscreen. The networking device 87 is used by multiple terminals and a server to connect and upload and download data by using a network, and used by multiple terminals to connect and perform data transmission by using a network.

The server may be formed by a cluster system, and to implement functions of various units, the functions may be combined or functions of the units are separately provided in an electronic device. Either the terminal or the server at least includes a database for storing data and a processor for data processing, or includes a storage medium disposed in the server or a storage medium that is disposed separately. For the processor for data processing, during processing, a microprocessor, a central processing unit (CPU), a digital signal processor (DSP), or a field programmable gate array (FPGA) may be used for implementation. The storage medium includes an operation instruction, the operation instruction may be computer executable code, and operations in the procedure of the information processing method in the embodiments of the present technology are implemented by using the operation instruction.

This embodiment of the present technology provides a computer storage medium. A computer executable instruction is stored in the computer storage medium, and the computer executable instruction is configured to perform the information processing method in the embodiments of the present technology.

This embodiment of the present technology is described below by using an actual application scenario as an example.

This application scenario is related to Multiplayer Online Battle Arena Games (MOBA). In MOBA, related terms are as follows: 1) UI layer, that is, an icon in a graphical user interface; 2) skill indicator: a special effect, a halo, or an operation used to supplement skill release; 3) lens, which may be understood as a camera in the game; 4) mini map: a scaled-down version of a large map, which may be understood as a radar map, where information and locations of two parties are displayed in the map; and 5) spellcasting focus: a focus is a location of a finger on a screen when an icon is tapped.

Figure 11:
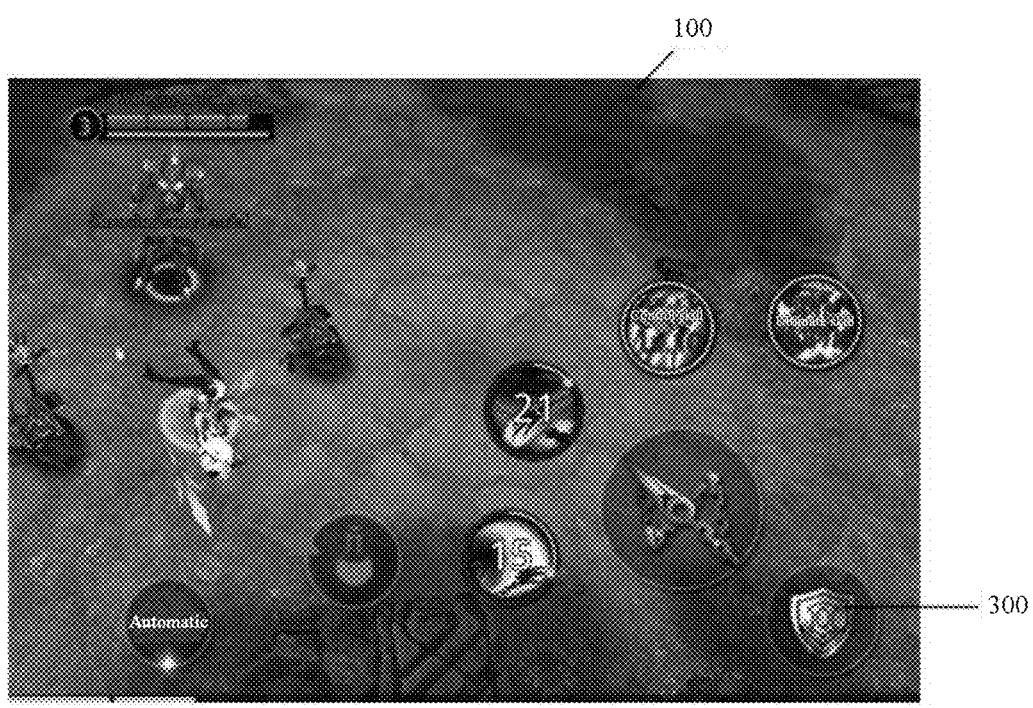
FIG. 11 is a schematic diagram of a UI in a specific application scenario in the existing technology.

In this application scenario, in current game products of the phone game MOBA, processing on multiple skills on a screen of a terminal is usually limiting a quantity of the skills. For example, a player is allowed to operate only four skills, and usually, other skills are inserted to blank locations in an interface as far as possible, as shown in FIG. 11. As can be learned form the UI shown in FIG. 11, a skill object is inserted to any location on the screen randomly, to facilitate subsequent skill release, which makes the UI very crowded. In a process of tapping a skill, because it is crowded in layout, the finger often taps a wrong place due to an uncertain location of a newly added skill. Consequently, extensibility is very poor, adding of a new skill is basically impossible, and a location of a skill cannot be self-defined.

Figure 12:
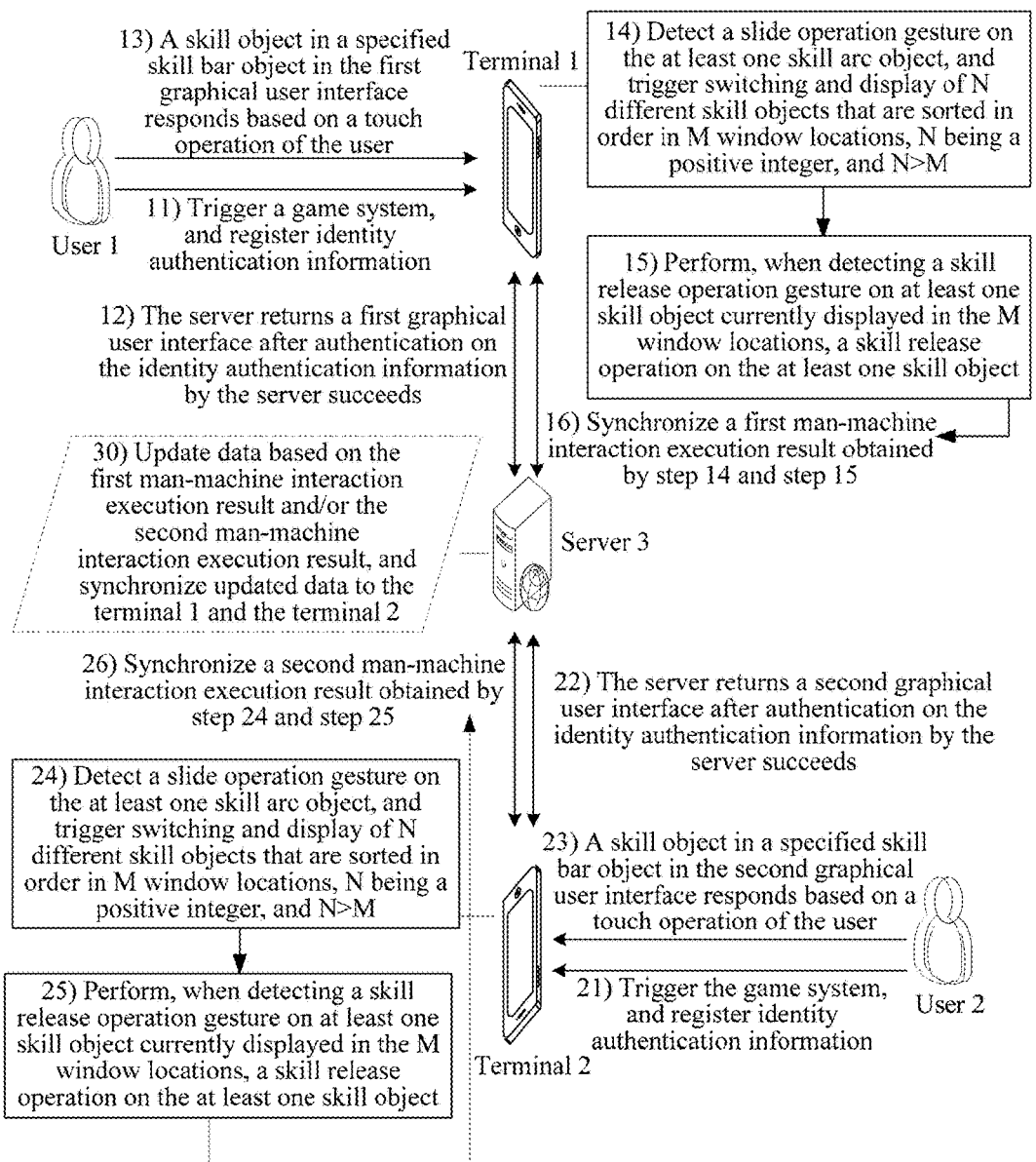
FIG. 12 is a schematic flowchart of a method of a specific example application scenario to which an embodiment of the present technology is applied.

In this application scenario, by means of this embodiment of the present technology, an operation of self-defining a skill ring or a skill arc is used to set multiple skills in one skill ring or one skill arc. Different skills are directly switched by means of operations of sliding clockwise or anticlockwise. For the skill arc, at least three skills are displayed on the screen, and the at least three skills are released by means of a release trigger gesture. In such a manner of using the skill arc and limiting three window locations, in a case of saving a presentation area in the interface by using the skill arc, multiple skills are added; and by adding a skill in a self-defined manner, the manner can adapt to a case in which there are more or fewer skills. If there are fewer skills, sliding is not performed (less than three skills), or if there are more skills, sliding is not performed if sliding can be performed (more than three skills), so that an area of the screen is saved, a location of the skill arc is controllable, and a probability that the finger of the user taps a wrong place is greatly reduced. A specific interaction procedure is shown in FIG. 12. User operations presented in the interaction procedure and UI presentation includes: a player may slide the skill arc clockwise or anticlockwise with the finger to slide three skills of skills 1 to 8 to the screen; in this way, there are always three skills on the screen for use by the player, and for the skills 1 to 8, by means of an outside setting interface, corresponding skills are placed.

In this embodiment of the present technology, two actual application scenarios of a skill ring object and a skill arc object are included. FIG. 12 is a schematic flowchart of specific interaction in the information processing method in this application scenario. Only a scenario of a skill arc is used for description.

For a user 1, operation 11 to operation 16 are included.

Operation 11: The user 1 triggers a game system by using a terminal 1, and registers identity authentication information, where the identity authentication information may be a user name and a password.

Operation 12: The terminal 1 transmits the obtained identity authentication information to a server 3, and the server 3 performs identity authentication, and returns a first graphical user interface to the terminal 1 after the identity authentication succeeds, where the first graphical user interface includes a virtual resource object. It is deployed in such a manner that at least one skill arc object in at least one skill operation area in the graphical user interface includes M window locations, where M is a positive integer.

Operation 13: A skill object in a specified skill arc object can respond based on a touch operation of the user 1, and performs a series of virtual operations in operation 14 to operation 16.

Operation 14: Detect a slide operation gesture on the at least one skill arc object, and trigger switching and display of N different skill objects that are sorted in order in the M window locations, N being a positive integer, and N>M.

Operation 15: Perform, when detecting a skill release operation gesture on at least one skill object currently displayed in the M window locations, a skill release operation on the at least one skill object.

Operation 16: Synchronize an execution result obtained by performing operation 14 and operation 15 to the server, or instantly transfer the execution result to a terminal 2 by using the server, or directly forward the execution result to the terminal 2, so that a user 2 that logs in to the game system by using the terminal 2 can respond to the virtual operation of the user 1, so as to implement interaction between multiple terminals. In this application scenario, only interaction between two terminals is used as an example, and during an actual operation, interaction between multiple terminals may be not limited to interaction between the two terminals in this example.

For the user 2, operation 21 to operation 26 are included for the user 1.

Operation 21: The user 2 triggers the game system by using the terminal 2, and registers identity authentication information, where the identity authentication information may be a user name and a password.

Operation 22: The terminal 1 transmits the obtained identity authentication information to the server 3, and the server 3 performs identity authentication, and returns a second graphical user interface to the terminal 2 after the identity authentication succeeds, where the second graphical user interface includes a virtual resource object. It is deployed in such a manner that at least one skill arc object in at least one skill operation area in the graphical user interface includes M window locations, where M is a positive integer.

Operation 23: A skill object in a specified skill arc object can respond based on a touch operation of the user 2, and performs a series of virtual operations in operation 24 to operation 26.

Operation 24: Detect a slide operation gesture on the at least one skill arc object, and trigger switching and display of N different skill objects that are sorted in order in the M window locations, N being a positive integer, and N>M.

Operation 25: Perform, when detecting a skill release operation gesture on at least one skill object currently displayed in the M window locations, a skill release operation on the at least one skill object.

Operation 26: Synchronize an execution result obtained by performing operation 24 and operation 25 to the server, or instantly transfer the execution result to the terminal 1 by using the server, or directly forward the execution result to the terminal 1, so that the user 1 that logs in to the game system by using the terminal 1 can respond to the virtual operation of the user 2, so as to implement interaction between multiple terminals. In this application scenario, only interaction between two terminals is used as an example, and during an actual operation, interaction between multiple terminals may be not limited to interaction between the two terminals in this example.

Operation 30: An optional operation: Synchronize or transfer, after receiving a first man-machine interaction execution result obtained by operation 14 to operation 16 and/or a second interaction execution result obtained by operation 24 to operation 26, the first man-machine interaction execution result and/or the second interaction execution result to corresponding terminals.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present technology may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a portable storage device, a read-only memory (ROM), a random access memory (RAM), a magnetic disk, or an optical disc.

Alternatively, in the present disclosure, when the integrated unit is implemented in a form of a software functional module and sold or used as an independent product, the integrated unit may be stored in a computer-readable storage medium. Based on such an understanding, the technical solutions of the embodiments of the present technology essentially, or the part contributing to the existing technology may be implemented in a form of a software product. The computer software product is stored in a storage medium, and includes several instructions for instructing a computer device (which may be a personal computer, a server, or a network device) to perform all or some of the methods described in the embodiments of the present technology. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

By means of the foregoing two solutions in the embodiments of the present technology, a skill ring object or a skill arc object (a skill arc is a part of a skill ring) is deployed at a determined location. Therefore, it is convenient for a user to perform searching, and find the skill ring object or the skill arc object easily, so as to perform a subsequent skill release operation. The skill ring object or the skill arc object includes M window locations that do not occupy a lot of space, and there are N corresponding specific skill objects. In a case of the skill ring object, N=M, a response is made by means of a detected touch operation, and further, a skill release operation is performed on at least one skill object when a corresponding skill release operation gesture is detected. In a case of the skill arc object, N>M, a response is made by means of a detected slide operation, and further, a skill release operation is further performed on at least one skill object when a corresponding skill release operation gesture is detected. As can be learned, no matter how a quantity of added skills increases, an area of a screen is not massively occupied, because the M window locations keep unchanged. Therefore, by means of the embodiments of the present technology, efficiency of performing another operation by a user is not affected, a misoperation is avoided, and operation precision is improved. In addition, an area of a screen is not massively occupied.

What is claimed is:

1. An information processing method, comprising:
   at a device having one or more processors and memory:
   displaying, in a game user interface, a first game scene including at least one game character;
   displaying a skill selection object in the game user interface, the skill selection object including a plurality skill slots;
   determining a set of deployable skills corresponding to the first game scene, wherein a total number and types of skills included the set of deployable skills are dynamically determined based on a predefined set of characteristics of the first game scene; and
   distributing the set of deployable skills into one or more of the plurality of skill slots in the skill selection object, wherein a corresponding skill is deployed in the first game scene when selected by a user from the one or more of the plurality of skill slots in the skill selection object.

2. The information processing method 1, wherein displaying the skill selection object in the game user interface includes displaying the skill selection object with the plurality of skill slots distributed around a game character corresponding to a game player controlling the device.

3. The information processing method 2, wherein displaying the skill selection object in the game user interface includes:
   displaying the skill selection object in a first state with the plurality of skill slots retracted;
   while displaying the skill selection object in the first state, detecting a first user input directed to the skill selection object; and
   in response to receiving the first user input directed to the skill selection object displayed in the first, displaying the skill selection object in a second state with the plurality of skill slots expanded around a center of the skill selection object.

4. The information processing method 1, wherein the set of deployable skills corresponding to the first game scene includes a number of skills that is greater than a number of skill slots in the skill selection object, and wherein the method further includes:
   while displaying a first subset of the set of deployable skills in the plurality of skill slots of the skill selection object, detecting a second user input including a swipe gesture in a first direction on the skill selection object; and
   in response to detecting the second user input, scrolling the skill selection object to display a second subset of the set of deployable skills in the plurality of skill slots, wherein the second subset of the set of deployable skills include at least one skill that was not included in the first subset of the set of deployable skills.

5. The information processing method 1, wherein the set of deployable skills corresponding to the first game scene includes a number of skills that is greater than a number of skill slots in the skill selection object, and wherein the method further includes:
   while displaying a first subset of the set of deployable skills in the plurality of skill slots of the skill selection object, detecting a second user input including a swipe gesture in a first direction on the skill selection object; and
   in response to detecting the second user input, scrolling the skill selection object to display a second subset of the set of deployable skills in the plurality of skill slots, wherein the second subset of the set of deployable skills include at least one skill that was not included in the first subset of the set of deployable skills.

6. The information processing method 1, wherein displaying the skill selection object in the game user interface includes displaying the skill selection object at a location on the first game scene in accordance with a touch location of an input object on a touch-sensitive display of the device.

7. The information procecessing method 1, wherein at least one of the skill slot includes sub-slots that are displayed when the at least one skill slot is selected by a user, and wherein a total number of sub-slots included for the at least one skill slot depends on a respective skill that is currently distributed to the at least one skill slot.

8. An electronic device, comprising:
   one or more processors; and
   memory storing instructions, the instructions, when executed by the one or more processors, cause the processors to perform operations comprising:
      displaying, in a game user interface, a first game scene including at least one game character;
      displaying a skill selection object in the game user interface, the skill selection object including a plurality skill slots;
      determining a set of deployable skills corresponding to the first game scene, wherein a total number and types of skills included the set of deployable skills are dynamically determined based on a predefined set of characteristics of the first game scene; and
      distributing the set of deployable skills into one or more of the plurality of skill slots in the skill selection object, wherein a corresponding skill is deployed in the first game scene when selected by a user from the one or more of the plurality of skill slots in the skill selection object.

9. The electronic device of claim 8, wherein displaying the skill selection object in the game user interface includes displaying the skill selection object with the plurality of skill slots distributed around a game character corresponding to a game player controlling the device.

10. The electronic device of claim 9, wherein displaying the skill selection object in the game user interface includes:
    displaying the skill selection object in a first state with the plurality of skill slots retracted;
    while displaying the skill selection object in the first state, detecting a first user input directed to the skill selection object; and
    in response to receiving the first user input directed to the skill selection object displayed in the first, displaying the skill selection object in a second state with the plurality of skill slots expanded around a center of the skill selection object.

11. The electronic device of claim 10, wherein the set of deployable skills corresponding to the first game scene includes a number of skills that is greater than a number of skill slots in the skill selection object, and wherein the method further includes:
    while displaying a first subset of the set of deployable skills in the plurality of skill slots of the skill selection object, detecting a second user input including a swipe gesture in a first direction on the skill selection object; and
    in response to detecting the second user input, scrolling the skill selection object to display a second subset of the set of deployable skills in the plurality of skill slots, wherein the second subset of the set of deployable skills include at least one skill that was not included in the first subset of the set of deployable skills.

12. The electronic device of claim 8, wherein the set of deployable skills corresponding to the first game scene includes a number of skills that is greater than a number of skill slots in the skill selection object, and wherein the method further includes:
    while displaying a first subset of the set of deployable skills in the plurality of skill slots of the skill selection object, detecting a second user input including a swipe gesture in a first direction on the skill selection object; and
    in response to detecting the second user input, scrolling the skill selection object to display a second subset of the set of deployable skills in the plurality of skill slots, wherein the second subset of the set of deployable skills include at least one skill that was not included in the first subset of the set of deployable skills.

13. The electronic device of claim 8, wherein displaying the skill selection object in the game user interface includes displaying the skill selection object at a location on the first game scene in accordance with a touch location of an input object on a touch-sensitive display of the device.

14. The electronic device of claim 8, wherein at least one of the skill slot includes sub-slots that are displayed when the at least one skill slot is selected by a user, and wherein a total number of sub-slots included for the at least one skill slot depends on a respective skill that is currently distributed to the at least one skill slot.

15. A non-transitory computer-readable storage medium storing instructions, the instructions, when executed by one or more processors, cause the processors to perform operations comprising:
    displaying, in a game user interface, a first game scene including at least one game character;
    displaying a skill selection object in the game user interface, the skill selection object including a plurality skill slots;
    determining a set of deployable skills corresponding to the first game scene, wherein a total number and types of skills included the set of deployable skills are dynamically determined based on a predefined set of characteristics of the first game scene; and
    distributing the set of deployable skills into one or more of the plurality of skill slots in the skill selection object, wherein a corresponding skill is deployed in the first game scene when selected by a user from the one or more of the plurality of skill slots in the skill selection object.

16. The non-transitory computer-readable storage medium of claim 15, wherein displaying the skill selection object in the game user interface includes displaying the skill selection object with the plurality of skill slots distributed around a game character corresponding to a game player controlling the device.

17. The non-transitory computer-readable storage medium of claim 16, wherein displaying the skill selection object in the game user interface includes:
    displaying the skill selection object in a first state with the plurality of skill slots retracted;
    while displaying the skill selection object in the first state, detecting a first user input directed to the skill selection object; and
    in response to receiving the first user input directed to the skill selection object displayed in the first, displaying the skill selection object in a second state with the plurality of skill slots expanded around a center of the skill selection object.

18. The non-transitory computer-readable storage medium of claim 17, wherein the set of deployable skills corresponding to the first game scene includes a number of skills that is greater than a number of skill slots in the skill selection object, and wherein the method further includes:
    while displaying a first subset of the set of deployable skills in the plurality of skill slots of the skill selection object, detecting a second user input including a swipe gesture in a first direction on the skill selection object; and
    in response to detecting the second user input, scrolling the skill selection object to display a second subset of the set of deployable skills in the plurality of skill slots, wherein the second subset of the set of deployable skills include at least one skill that was not included in the first subset of the set of deployable skills.

19. The non-transitory computer-readable storage medium of claim 15, wherein the set of deployable skills corresponding to the first game scene includes a number of skills that is greater than a number of skill slots in the skill selection object, and wherein the method further includes:
    while displaying a first subset of the set of deployable skills in the plurality of skill slots of the skill selection object, detecting a second user input including a swipe gesture in a first direction on the skill selection object; and
    in response to detecting the second user input, scrolling the skill selection object to display a second subset of the set of deployable skills in the plurality of skill slots, wherein the second subset of the set of deployable skills include at least one skill that was not included in the first subset of the set of deployable skills.

20. The non-transitory computer-readable storage medium of claim 15, wherein displaying the skill selection object in the game user interface includes displaying the skill selection object at a location on the first game scene in accordance with a touch location of an input object on a touch-sensitive display of the device.

* * * * *